US007010176B2

(12) United States Patent
Kusunoki

(10) Patent No.: US 7,010,176 B2
(45) Date of Patent: Mar. 7, 2006

(54) IMAGING SYSTEM FOR AUTOMATIC RESOLUTION ADJUSTMENT

(75) Inventor: Naoki Kusunoki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 556 days.

(21) Appl. No.: 09/933,758

(22) Filed: Aug. 22, 2001

(65) Prior Publication Data

US 2002/0048413 A1 Apr. 25, 2002

(30) Foreign Application Priority Data

Aug. 23, 2000 (JP) .............................. 2000-252988

(51) Int. Cl.
G06K 9/32 (2006.01)
(52) U.S. Cl. ...................... 382/299; 382/276; 382/282; 382/284; 358/1.18
(58) Field of Classification Search ................ 382/282, 382/284, 299, 296; 358/3.28, 1.18
See application file for complete search history.

(56) References Cited

U.S. PATENT DOCUMENTS

| 5,301,244 | A | * | 4/1994 | Parulski ...................... 382/319 |
| 5,550,955 | A | * | 8/1996 | Morikawa ................... 358/1.9 |
| 6,208,770 | B1 | * | 3/2001 | Gilman et al. .............. 382/305 |
| 6,388,679 | B1 | * | 5/2002 | Kluck et al. ................ 345/698 |
| 6,430,320 | B1 | * | 8/2002 | Jia et al. ..................... 382/289 |
| 6,431,448 | B1 | * | 8/2002 | Nelson et al. ......... 235/462.13 |
| 6,643,416 | B1 | * | 11/2003 | Daniels et al. .............. 382/299 |
| 6,868,189 | B1 | * | 3/2005 | Hoshino ..................... 382/260 |

OTHER PUBLICATIONS

Oki Electric Industry Co., Ltd., "Oki Technical Review", No. 1 vol. 69 Apr. 2002.*
Gary David Bouton and Barbara Bouton, "Inside Adobe Photoshop 5".*

* cited by examiner

Primary Examiner—Andrew W. Johns
Assistant Examiner—Patrick L Edwards
(74) Attorney, Agent, or Firm—Sughrue Mion, PLLC

(57) ABSTRACT

An imaging device (10) has a card reader (13), a reflective scanner (14) and a film scanner (15). The scanners has a pre-scanning mode of a low resolution and a fine scanning mode of a higher resolution. A preview image is displayed on the basis of image data taken from an original image through the scanner in the pre-scanning mode, and a cropping area of the original is designated on the preview image. An input resolution setting section (26) automatically sets the higher resolution for the fine scanning in accordance with the original size of the cropping area, a print size of the cropping area, and an output resolution of a printer (16). Based on image data taken at the higher resolution from the cropping area of the original image, the printer prints out an image.

23 Claims, 16 Drawing Sheets

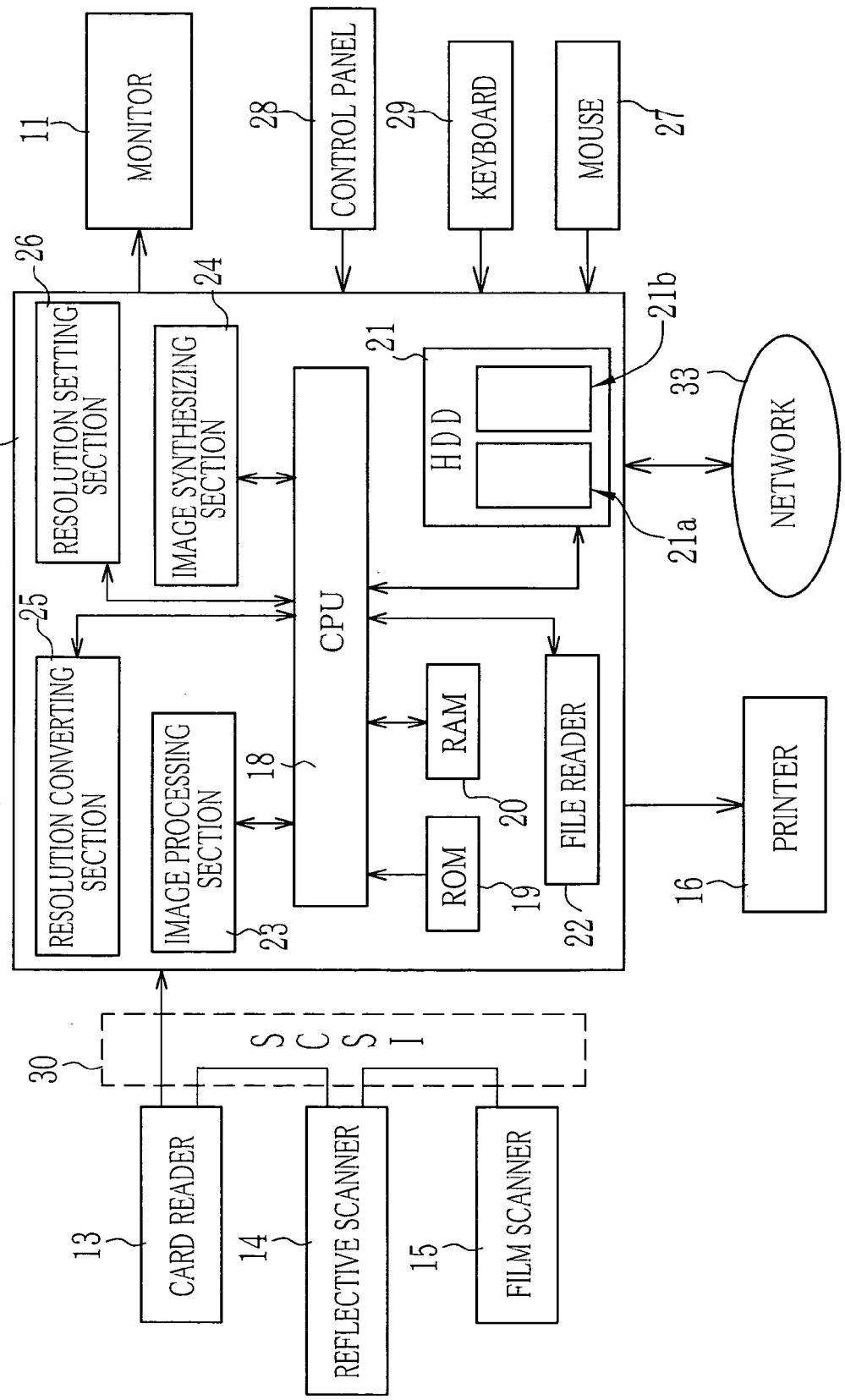

| 26a | |
|---|---|
| 1 | 200 dpi |
| 2 | 250 dpi |
| 3 | 300 dpi |
| 4 | 350 dpi |
| 5 | 400 dpi |
| 6 | 450 dpi |
| 7 | 500 dpi |

| 26b | |
|---|---|
| 1 | 500 dpi |
| 2 | 1000 dpi |
| 3 | 1500 dpi |
| 4 | 2000 dpi |

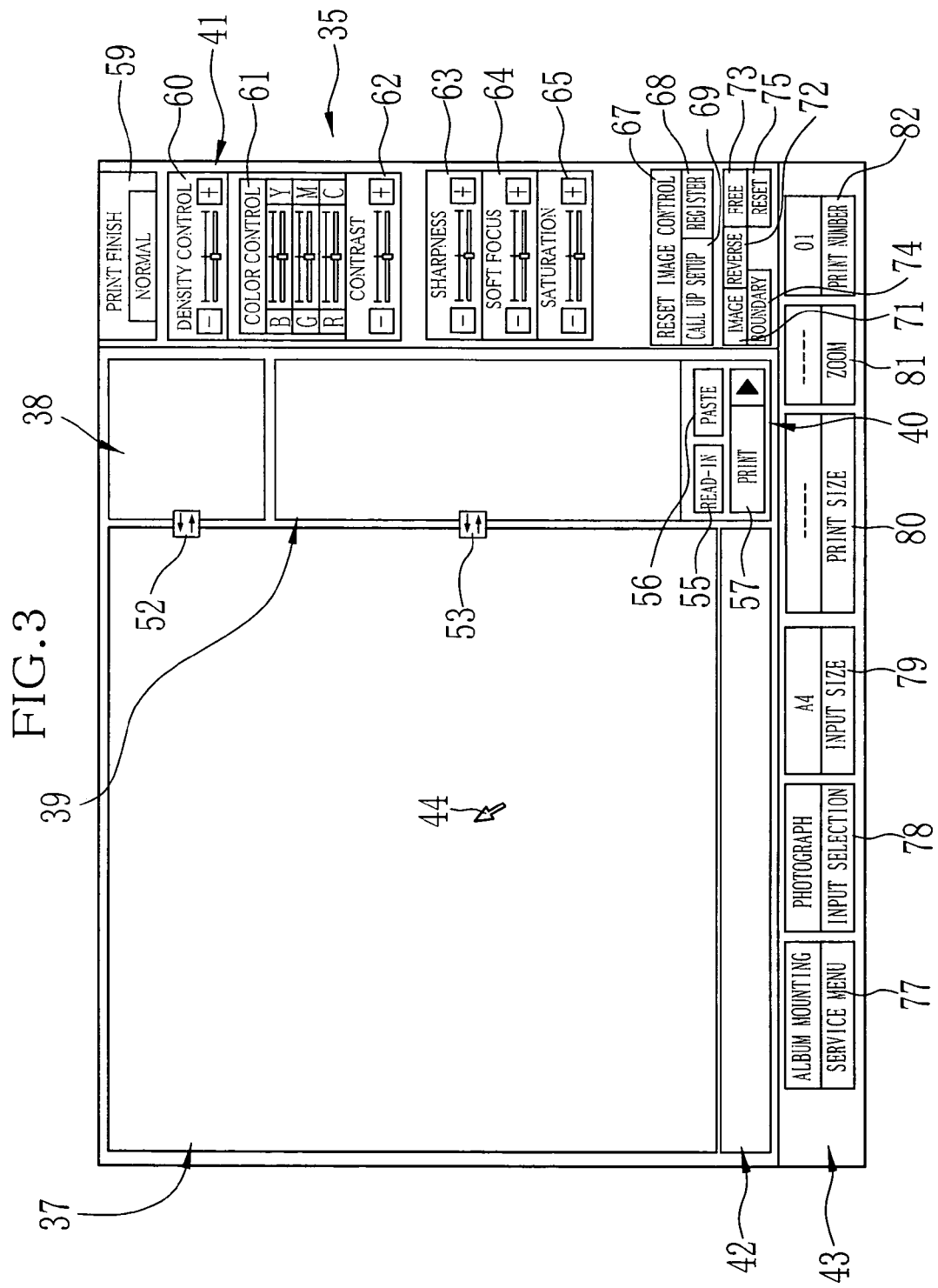

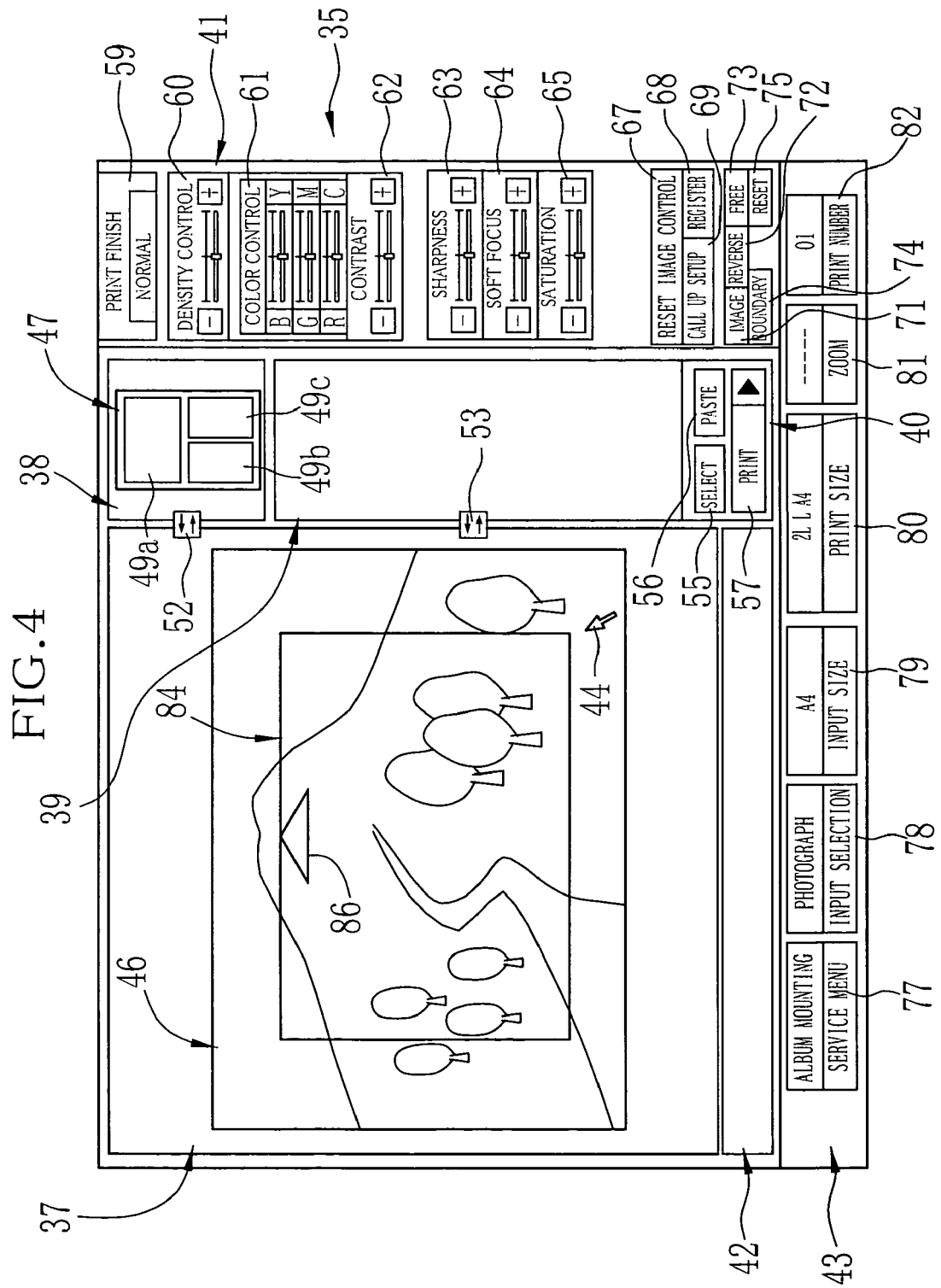

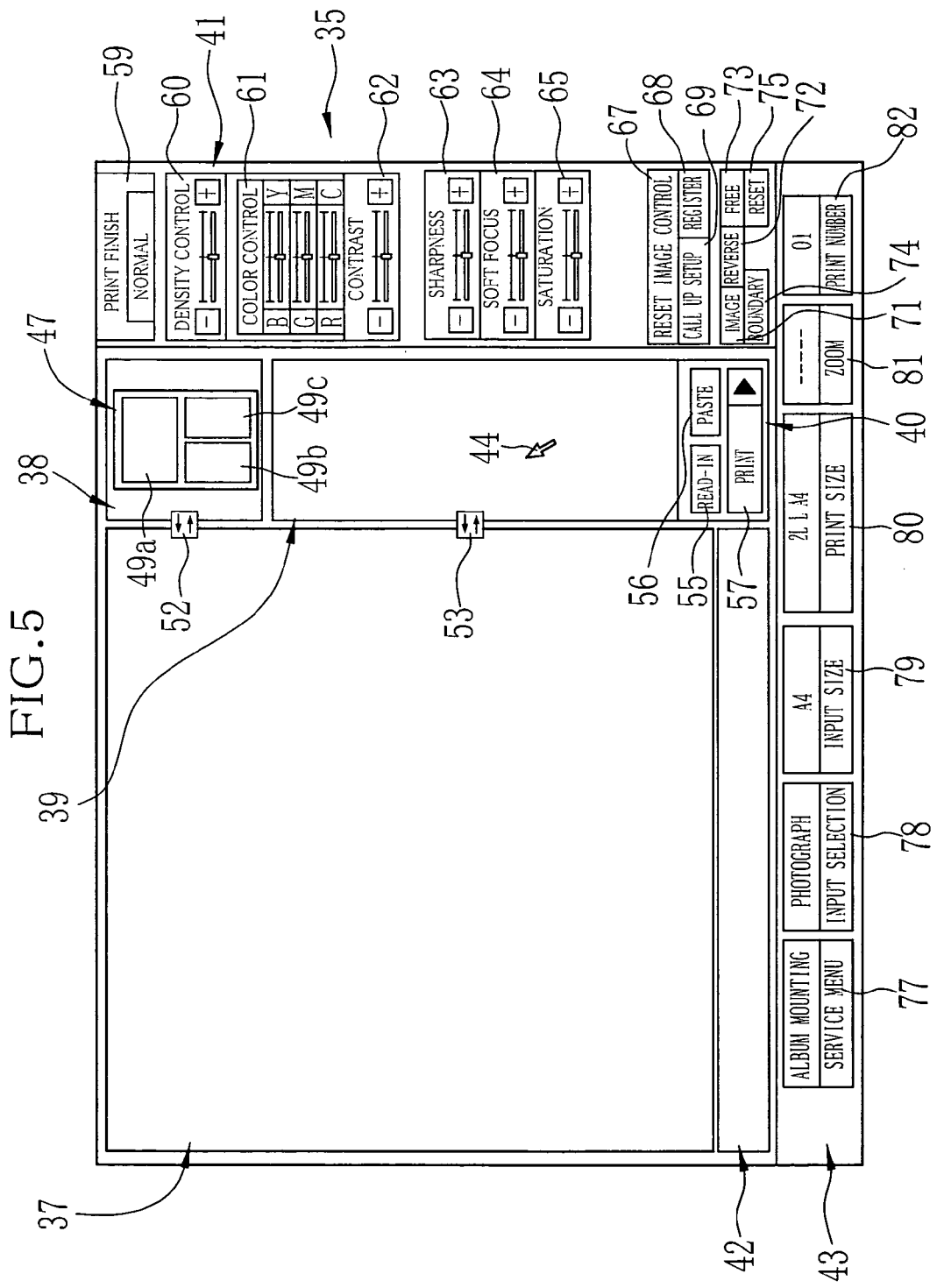

SUPERIMPOSE A2 HORIZONTAL

SUPERIMPOSE A4 VERTICAL

SUPERIMPOSE OBLONG A4 HORIZONTAL

MULTI-SUPERIMPOSE A4 HORIZONTAL

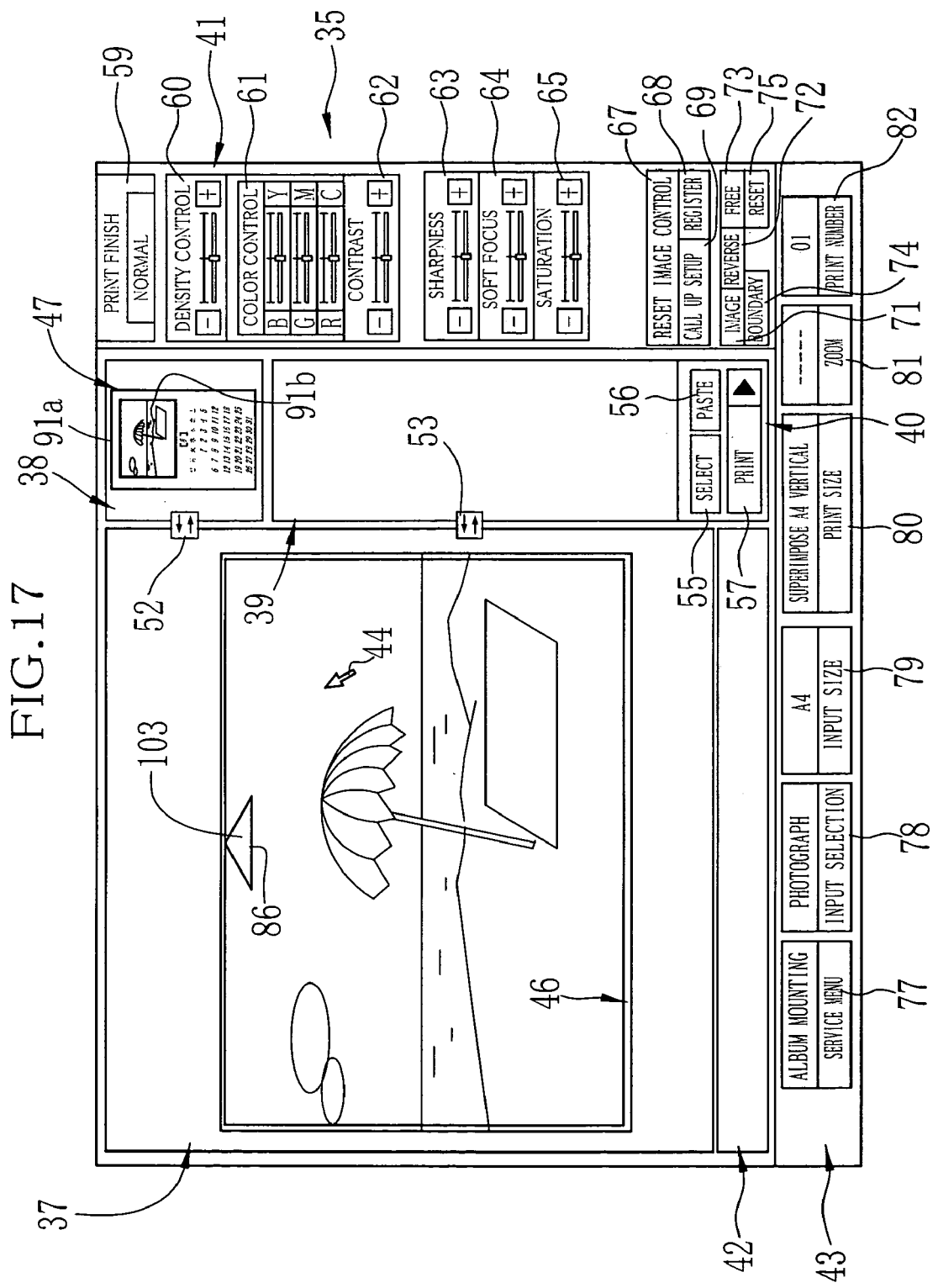

IMAGING SYSTEM FOR AUTOMATIC RESOLUTION ADJUSTMENT

BACKGROUND OF THE INVENTION

1. Field of the Invention

The present invention relates to an imaging system for forming an image on the basis of image data entered into the imaging system, and more particularly to an imaging system that adjusts resolution of the image data according to an output resolution of a printer that is used for making a hard copy of the image.

2. Background Arts

An imaging system has been known in the art, wherein electronic images are taken out from different kinds of storage media, and are processed for correcting the image quality or for synthesizing with an optional template image, to print out hard copies of the electronic images. The imaging system consists of image input devices, a computer and a printer. As the image input devices, there are a reflective scanner that reads out electronic images from reflective originals, such as a photo-print printed on photographic paper and other kinds of printed matters printed on reflective recording material, a film scanner that reads out electronic images from negative or positive film, and a card reader that reads out digital image data from a storage card, the digital image data being picked up through an electronic still camera, called a digital still camera.

The Image data read in through the image input device is temporarily stored in a storage medium, like RAM, and the computer processes the image data for gamma-conversion, YMC conversion and the like, for modifying image size or magnification, or for synthesizing a plurality of images. The printer prints out hard copies based on the processed image data.

Because the output resolution of the printer is determined, the resolution of the entered image should be matched to the output resolution, in order to obtain adequate quality of the printed image. That is, if the resolution of the entered image differs from the output resolution, the image data is interpolated or decimated to adjust the image resolution to the output resolution. Since there are such image scanners that can preset the input resolution for reading the image, it would be unnecessary to convert the resolution of the entered image if the input resolution of the scanner is preset to a value that is optimum in view of the output resolution of the printer. Where the scanner may have a remarkably higher resolution than the output resolution, adjusting the input resolution to the output resolution saves both the time for reading the image data (i.e. the time for scanning the image) and the memory capacity necessary for storing the image data, because unnecessary or redundant image data is skipped.

However, it has conventionally been necessary for the operator to set up the input resolution of the scanner for each individual image. Especially when a plurality of images are to be read out from different originals and pasted in different segments of a template image, the input resolution must be set up for each image on the basis of an image magnification or reduction rate that is calculated for each image in consideration of the original image size and the print size of the pasted segment of that image. Where the input resolution of the scanner is adjustable by selecting from among several options, it is necessary to select the nearest value to the calculated resolution.

For calculating and setting the input resolution based on the image magnification or reduction rate, the operator must take many operation procedures, so the risk of setting a wrong value is pretty high.

SUMMARY OF THE INVENTION

In view of the foregoing, an object of the present invention is to provide an imaging system that is easy to operate and improved in work-efficiency of forming an image, especially a synthetic image, and produces a high quality image.

In an imaging system comprising an image input device for entering image data from an original image or an image file, an image processing device for processing the image data to produce an output image, and an image output device for outputting the output image as a hard copy or as data file, the improvement suggested by the present invention comprises a resolution adjusting device for automatically adjusting an input resolution of the image input device in accordance with an output resolution of the image output device, a size or data pixel number of the output image, and a size of the original image or a data pixel number of the image file.

Since an input resolution of the image input device is automatically adjusted in accordance with an output resolution of the image output device, a size or data pixel number of the output image, and a size of the original image or a data pixel number of the image file, there is no need for the operator to adjust the input resolution of the image input device, and the quality of the printed image is optimized.

According to another aspect of the present invention, an imaging system comprises a scanner, a monitor, an image processing device and a printer, the scanner having a pre-scanning mode for taking image data out of an original image at a low resolution to display a preview image on the monitor, and a main scanning mode for taking image data out of the original image at a higher resolution, wherein the image processing device produces an output image from the image data taken in the fine scanning mode, the imaging system comprising: a cropping area designating device for designating a cropping area of the original image on the preview image, the cropping area being to be scanned in the fine scanning mode; and a resolution setting device for obtaining an optimum resolution for the fine scanning mode on the basis of a size of the designated cropping area, a print size of the cropping area and an output resolution of the printer, and setting the higher resolution of the scanner at a value that is determined by the optimum resolution.

According to a further aspect of the present invention, an imaging system comprises an image input device for entering image data from an external data storage device that stores full-dressed image data of at least an image, and thumbnail image data of the image; a display device for displaying a thumbnail of the image on the basis of the thumbnail image data; a cropping area designating device for designating a cropping area of the entered image on the displayed thumbnail; a printer for printing the cropping area in a designated size on the basis of the full-dressed image data; and a resolution converting device for converting resolution of the full-dressed image data into a value that is determined in accordance with an original size and the designated print size of the cropping area, and an output resolution of the printer.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 1 is a block diagram illustrating an imaging system according to an embodiment of the present invention;

FIG. 3 is an explanatory diagram illustrating an initial display condition of a control screen for image processing, that is displayed on a monitor of the imaging system at the start of operation of the imaging system;

FIG. 4 is an explanatory diagram illustrating an example of display condition on the control screen when a first image to synthesize is entered;

FIG. 5 is an explanatory diagram illustrating an example of display condition on the control screen when a template is selected;

FIG. 17 is an explanatory diagram illustrating an example of display condition on the control screen when the main image is pasted in an inner frame of the template.

DETAILED DESCRIPTION OF THE EMBODIMENTS

Figures 2A, 2B, 2C:
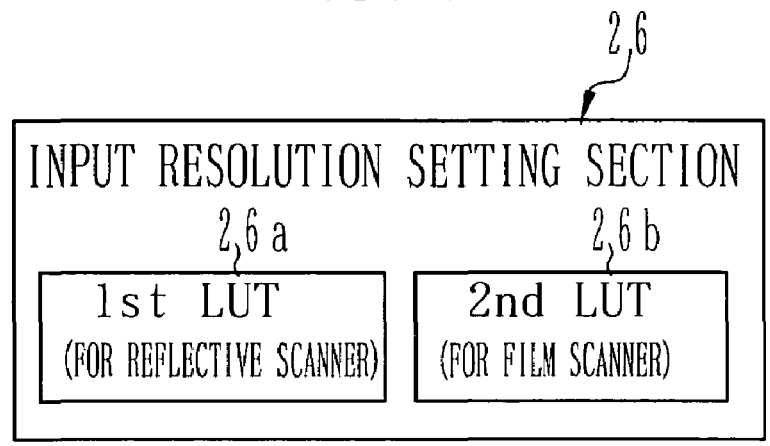
FIG. 2A is an explanatory diagrams illustrating an input resolution setting section.
FIGS. 2B and 2C are explanatory diagrams illustrating data of input resolutions stored in first and second LUTs of the input resolution setting section.

In FIG. 1, an imaging system 10 is mainly constituted of a personal computer 12, a monitor 11 as a display device, and a card reader 13, a reflective scanner 14 and a film scanner 15 as image input devices, and a printer 16 as an image output device. The monitor 11, the image input devices 13 to 15 and the printer 16 are connected to the personal computer 12. The printer 16 prints out hard copies of images processed in the personal computer 12. In this embodiment, the printer 16 is of a type that uses a heat-developing photosensitive recording material. Besides or instead of the printer 16, a signal sender for sending an image signal through a communication line may be provided as an image output device.

The personal computer 12 consists of a CPU 18, a ROM 19, a RAM 20, a hard disc drive (HDD) 21, a file reader 22, an image processing section 23, an image synthesizing section 24, a resolution converting section 25 and an input resolution setting section 26. For example, the file reader 22 is a floppy disc drive, and may read out image data from a floppy disc or write image data on a floppy disc. In that case, the file reader 22 is used as an image input device and a data recording device as well.

The HDD 21 is provided with a data storage section for storing any kind of data, and a program storage section where various programs are stored. The data storage section includes a batch processing holder 21a for temporary storage of produced image data before a plurality of images being printed in succession afterward, and a shared holder 21b that is accessible to other imaging systems through a network. The data storage section of the HDD 21 is used as an image output section.

A keyboard 29, a mouse 27 and a control panel 28 are also connected to the personal computer 12. The keyboard 29 is used for installing software-programs in the personal computer 12, setting up various parameters in the personal computer 12, or for maintenance. The control panel 28 is provided with operation buttons specific for controlling the imaging system 10, so the mouse 27 and the control panel 28 are used for imaging and processing.

The personal computer 12 is connected to a network 33, such as a LAN (Local Area Network) or the Internet. Through the network 33, the imaging system 10 can share the same data with and cooperate with other imaging systems installed in a photo-lab, or receive image data from a client. On communicating image data through the Internet, the image data is converted into a ciphered code, so that the image data may be accessible only for particular persons. In ciphering, accessible ranges are classified in a pyramid style, so that the right to access is given to those belonging to upper classes than a designated class.

The card reader 13, the reflective scanner 14 and the film scanner 15 are connected in cascade to the personal computer 12 through a SCSI interface 30 that is provided in the personal computer 12. The card reader 13 may read out image data from a storage card, such as a smart media (a trade name), as the card is put in the card reader 13. In this embodiment, the image data is assumed to be picked up and recorded on the storage card by an electronic still camera that may also be called a digital still camera.

The reflective scanner 14 is for reading out electronic images from reflective originals, such as photo-prints, instant photographs recorded on self-developing type photo film sheet, and printed matters. For example, the reflective scanner 14 is a flat head type wherein a line sensor scans across a reflective original stationary placed on a reading stage, to read out an image from the entire surface of the reflective original. But the reflective scanner 14 may be another type. For example, the reflective original may be conveyed perpendicularly to a stationary line sensor. The line sensor may be a CCD image sensor. The film scanner 15 is for reading out an image from a light-permeable material, such as negative or positive photo film. When the image is read out from the negative, the film scanner 15 converts it into a positive image before inputting it in the personal computer 12.

The image data input through the respective image input devices 13 to 15 is sent to the image processing section 23. The image processing section 23 consists of a color correction circuit and a gradation processing circuit. The color correction circuit controls the color balance of the input image, taking different spectral characteristics between these image input devices 13 to 15 into consideration. Concretely, the color correction circuit carries out γ-correction on red, green and blue (RGB) color signals of the image data with use of coefficients that are predetermined for the respective image input devices 13 to 15. The gradation processing circuit corrects gradation of the image data by use of one of a plurality of look-up tables (LUT) which are prepared for the respective image input devices 13 to 15, such that the gradation is well reproduced by the printer 16 of the imaging system 10.

Since the different kinds of reflective originals, including photo-prints, printed matters and instant photographs, use different color materials, more than one LUT is prepared for the reflective scanner 14, each LUT being prepared for one type of the color materials. By designating the kind of the reflective original the reflective scanner 14 is going to scan, one of the LUTs that is suitable for the color material used in the designated original is used for the gradation correction. Also for the film scanner 15, two types of LUTs are prepared: one for the negative film and the other for the positive film.

The image data recorded on the storage card includes a cluster of full-dress image data and a cluster of thumbnail image data for each image. The full-dress image data is obtained by photographing a subject with a high resolution, and the thumbnail image data is obtained by decimating the number of pixels of the full-dress image data. The thumbnail image data used for displaying a thumbnail of each image on the monitor 11, that is a preview of the image with a low resolution in a reduced size.

When the card reader 13 receives a read-in command, the card reader 13 reads out all the thumbnail image data from the storage card, so the thumbnails of the images recorded on the storage card are displayed on the monitor 11. The operator may chooses appropriate images from among the displayed thumbnails. After choosing the image and designating an area of the image to print, the full-dress image data of the chosen image is read out, and written on the RAM 20.

While the full-dress image data being read in, the resolution converting section 25 automatically converts the resolution of the full-dress image data into a value that matches an output resolution of the printer 16. When the resolution of the full-dress image data is greater than the output resolution of the printer 16, for example when the resolution of the full-dress image data is 800 dpi, while the output resolution of the printer 16 is 400 dpi (dot per inch), the full-dress image data is converted to have the same resolution as the output resolution through well-known decimation and pixel-coupling. If, on the other hand, the resolution of the full-dress image data is 200 dpi, the full-dress image data is converted to have the resolution of 400 dpi through pixel-interpolation.

The resolution conversion is performed in accordance with the size of the designated area to print out of the chosen image, called a cropping area, and the print size of the cropping area. For example, where the cropping area is of the L size (127 mm ×89 mm), whereas the printer size is of 2L size (178 mm×127 mm), the magnification rate is 178/128. Since the output resolution of the printer 16 is 400 dpi, in this instance, the optimum resolution of the image data in view of the output resolution of the printer 16 is calculated to be 400 dpi×178/128=556 dpi (fraction omitted). In that case, the resolution of the full-dress image data is converted from 800 dpi into 556 dpi through pixel-coupling or the like. The CPU 18 carries out the calculation for the resolution before the card reader 13 begins to read out the full-dress image data, so the resolution converting section 25 converts the image data on the basis of the calculated resolution.

On the other hand, where the cropping area is of 2L size (178 mm×127 mm), whereas the print size is of L size (127 mm ×89 mm), the reduction rate is 128/178. Therefore, the optimum resolution of the image data in view of the output resolution of the printer 16 is 400 dpi×128/178=287 dpi (fraction omitted). Then, the resolution of the full-dress image data is converted in accordance with the value calculated as above. If the output resolution of the printer is other than 400 dpi, e.g. 300 dpi, the optimum resolution of the image data is calculated on the basis of this output resolution.

The reflective scanner 14 and the film scanner 15 are provided with a pre-scanning mode of a low resolution and a fine scanning mode of a high resolution. The reflective scanner 14 or the film scanner 15 operates in the pre-scanning mode to input image data in the personal computer 12 for the sake of displaying an image on the monitor 11. The fine scanning mode is to input image data for the sake of synthesizing or printing an image.

In the present embodiment, the input resolution of the reflective scanner 14 is adjustable in seven grades: 200 dpi, 250 dpi, 300 dpi, 350 dpi, 400 dpi, 450 dpi and 500 dpi, whereas the input resolution of the film scanner 15 is adjustable in four grades: 500 dpi, 1000 dpi, 1500 dpi and 2000 dpi. The input resolution of the reflective scanner 14 or the film scanner 15 is automatically controlled in accordance with a setup signal from the input resolution setting section 26.

The input resolution setting section 26 is provided with a first LUT 26a and a second LUT 26b, as shown in FIG. 2A. The first LUT 26a is for the reflective scanner 14, and stores the seven grades resolution values, as shown in FIG. 2B. The second LUT 26b is for the film scanner 15, and stores the four grades resolution values, as shown in FIG. 2C. The CPU 18 calculates an optimum resolution in view of the output resolution of the printer 16 on the basis of the size of the cropping area and the print size of that area, and selects the nearest value to the optimum resolution from among the values stored in the first or the second LUT 26a or 26b, and sends it to the reflective scanner 14 or the film scanner 15.

The reflective scanner 14 or the film scanner 15 switches over the input resolution in accordance with the received setup signal, and makes the fine scanning with the selected input resolution. The CPU 18 sends data of the cropping area to the reflective scanner 14 or the film scanner 15, so the line sensor scans only the designated cropping area, and moves over other areas of the original faster than during the scanning. Thus, it takes a shorter time for scanning one image.

For instance, where a cropping area to be scanned by the reflective scanner 14 is to be printed in the same size, that is, the print size is equal in size to the cropping area, the optimum resolution of the image data for printing is equal to the output resolution of the printer 16. In that case, since the output resolution is 400 dpi in this instance, the input resolution setting section 26 reads out the value "400 dpi" from the first LUT 26a, and sends this value to the reflective scanner 14. So the reflective scanner 14 makes fine-scanning with the input resolution of 400 dpi.

Where a cropping area to be scanned by the reflective scanner 14 is of A4 size (296 mm×210 mm) and is to be printed in 2L size (178 mm×127 mm), the reduction rate is 178/296. Assuming that the output resolution of the printer 16 is 400 dpi, the optimum resolution of the image data for printing is 400 dpi×178/296=240 dpi. Then, the input resolution setting section 26 reads out the value "250 dpi" from the first LUT 26a, as the nearest value to the 240 dpi, and sends this value to the reflective scanner 14. So the reflective scanner 14 makes fine-scanning with the input resolution of 250 dpi.

Where the film scanner 15 is to scan the entire image of a 35 mm negative film's full-size frame (36 mm×24 mm), and the scanned image is to be printed in L size (127 mm×89 mm), the magnification rate is 127/36. Assuming that the output resolution of the printer 16 is 400 dpi, the optimum resolution of the image data for printing is 400 dpi×127/36=1411 dpi. Then, the input resolution setting section 26 reads out the value "1500 dpi" from the second LUT 26b, as the nearest value to the reflective scanner 1411 dpi, and sends this value to the film scanner 15. So the film scanner 15 makes fine-scanning with the input resolution of 1500 dpi.

The input resolution of the reflective scanner 14 or the film scanner 15 may be changed by changing the sampling intervals of the line sensor in the sub scan direction, or by changing the speed of movement of the line sensor relative to the original or the film while maintaining the sampling intervals in the sub scan direction unchanged. As for the main scan direction, the input resolution may be changed by pixel-coupling or decimation, wherein the pixel-coupling is obtaining a mean level of signals from a number of neighboring photo-sensor cells of the line sensor, the number being determined by the selected resolution. On the other hand, the decimation is deactivating the photo-sensor cells of the line sensor at regular intervals to reduce the number of pixels per line.

Adjusting the input resolution of the reflective scanner 14 or the film scanner 15 to the output resolution of the printer 16 saves both the time for reading the image data (i.e. the time for scanning the image) and the memory capacity necessary for storing the image data, because unnecessary or redundant image data is skipped. Besides that, the optimum input resolution is automatically selected, so the operator does not need to calculate the optimum input resolution. This prevents selecting a wrong resolution, and improves work efficiency. The output resolution of the printer 16 is not limited to the above value.

In the pre-scanning mode, the image processing section 23 corrects color and gradation of the input image data, and the results of correction are reflected by the image displayed on the monitor 11. In the fine scanning mode, correction parameters applied to the image data during the pre-scanning mode are transferred to an image data converter built in the reflective scanner 14 or to an image data converter built in the film scanner 15, so the γ-conversion and the gradation correction of the image data is performed in the reflective scanner 14 or in the film scanner 15 on the basis of the correction parameters. That is, the image data bypasses the image processing section 23 of the personal computer 12, when it is written on the RAM 20 in the fine scanning mode.

The image synthesizing section 24 performs a variety of image processing operations, like magnification changing of a selected image, cropping and synthesizing with a template or other input images.

Image processing software specific for the imaging system 10 is installed in the personal computer 12, for permitting processing and synthesizing image data. The image processing section 23, the image synthesizing section 24, the resolution converting section 25 and the input resolution setting section 26 are activated by starting up the image processing software. When the image processing software is started up, a corresponding control screen 35 appears on the monitor 11, as shown in FIG. 3, so the operator of the imaging system may operate functional buttons on the control screen 35 by use of the mouse 27 or the control panel 28, to work the imaging system 10.

The control screen 35 of the image processing software is of a fixed multi-window type that adopts Graphical User Interface (GUI) in a number of working areas whose positions and sizes are fixed. The control screen 35 consists of a largest main display area 37, first and second sub display areas 38 and 39 and a main control command display area 40 which are located on the right side of the main display area 37, an image quality control area 41 on the right side of these areas 38 to 40, a message display area 42 and a menu selection display area 43 which are located on the bottom of the control screen 35. A pointer 44 is also displayed on the control screen 35. The pointer 44 is movable through the mouse 27 or the control panel 28.

As shown in FIG. 4, the main display area 37 is an input image display area where an image 46 to synthesize is displayed in a large size, that is selected from among a plurality of images entered through the respective image input devices. When more than one image is to be synthesized with each other to produce a synthetic image, the images to synthesize are displayed one by one on the main display area 37.

The first sub display area 38 is a print preview area for displaying an image simulating a printed condition in a reduced size. When a number of images are to be synthesized with each other to produce a synthetic image, the image synthesizing process is successively displayed on the first sub display area 38. So the first sub display area 38 doubles as a synthetic image display area. At the first stage of image synthesizing, a template is selected, and a template image 47 corresponding to the selected template is displayed on the first sub display area 38, as shown for example in FIGS. 4 and 5. The template image 47 has at least a frame, three rectangular pasting frames 49a, 49b and 49c arranged side by side. The image 46 displayed in the main display area 37 may be pasted in the pasting frame 49a, 49b or 49c of the template image 47 in a manner as set forth in detail later.

Figure 6:
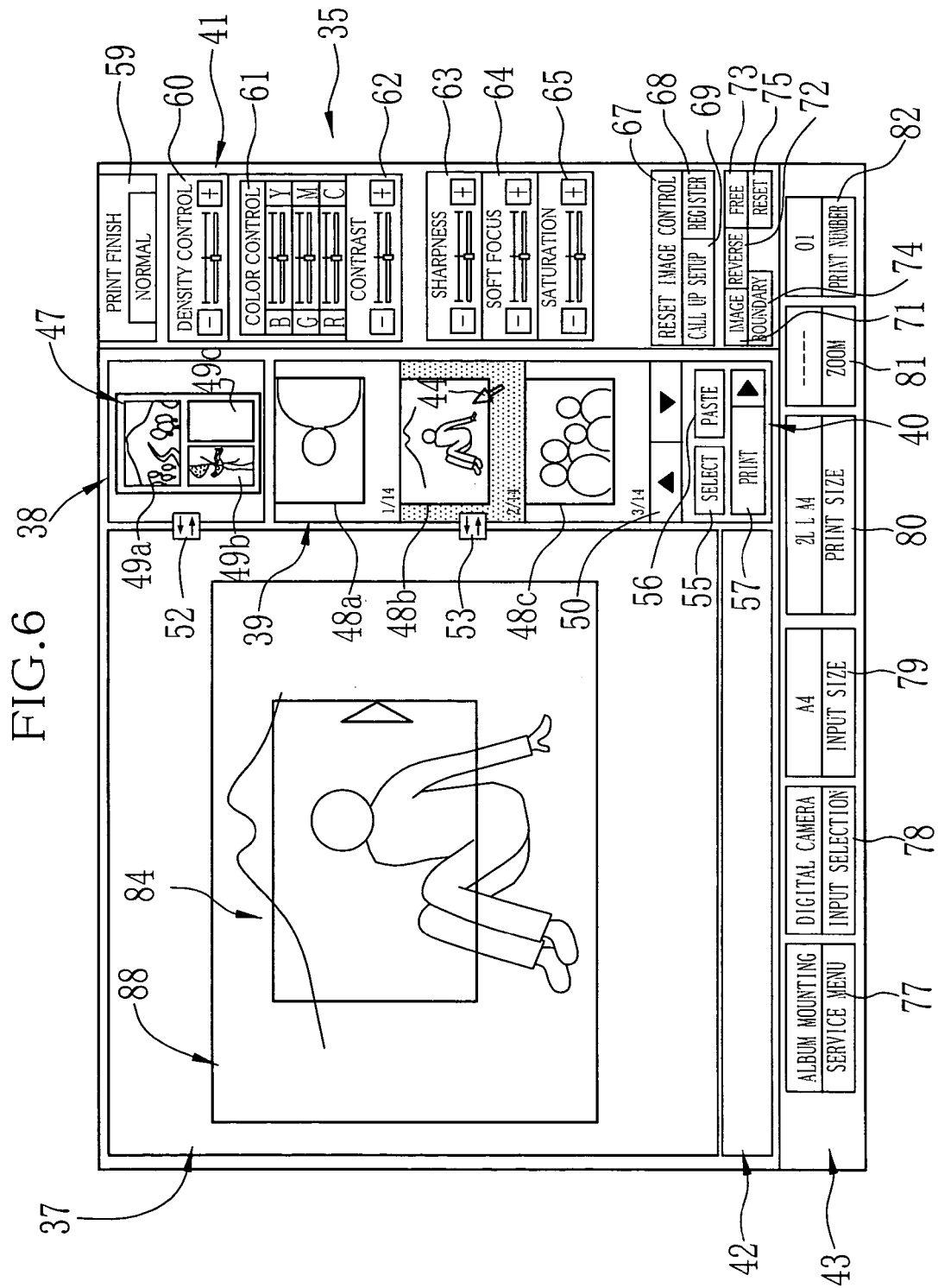
FIG. 6 is an explanatory diagram illustrating an example of display condition on the control screen when a third image to synthesize is selected from among a series of images photographed by a digital still camera and displayed as thumbnails on the control screen.

As shown in FIG. 6, the second sub display area 39 is a thumbnail display area where a number of thumbnails of images may be displayed when image data of those images is read in the personal computer 12. Three vertically arranged thumbnails 48a, 48b and 48c are displayed at a time in this embodiment. Any of the thumbnails 48a to 48c displayed on the second sub display area 39 may be selected to be synthesized, and the image corresponding to the selected thumbnail is displayed on the main display area 37. When a thumbnail is selected, the periphery of the selected thumbnail is displayed in the reversed color, to make apparent to the operator which of the thumbnails is presently selected.

Because the reflective scanner 14 or the film scanner 15 usually reads out a single original image at a time, the image read out through the reflective scanner 14 may be regarded as the image 46 to synthesize, and automatically displayed in the large size on the main display area 37.

As a storage card usually stores image data of more than three image frames, there is a need for displaying more than three images as input images on the second sub display area 39. In that case, a pair of scroll buttons 50 are displayed on the bottom of the second sub display area 39, to permit scrolling the thumbnails up and down and thereby displaying all of the input images in turns. If the image to read out from the storage card is previously determined, it is possible to designate that image to read out only image data of the designated image from the storage card, and display the designated image directly on the main display area 37.

A first display interchange button 52 is provided on a border between the main display area 37 and the first sub display area 38, and a second display interchange button 53 is provided on a border between the main display area 37 and the second sub display area 39. When the first display interchange button 52 is operated, then the image 46 that has been displayed in the main display area 37 is displayed in a reduced size in the first sub display area 38, and the image that has been displayed in the first sub display area 38 is displayed in an enlarged size in the main display area 37. In the same way, if the second display interchange button 53 is operated, the displayed contents are interchanged between the main display area 37 and the second sub display area 39. At that time, six of the thumbnails may be displayed at once on the main display area 37, making full use of the large main display area 37. If there are more than six thumbnails, a pair of page scrolling buttons may be displayed on the bottom side of the main display area 37, so that the operator may view all the thumbnails successively on the main display area 37.

With the first and second display interchange buttons 52 and 53, the small images displayed on the first or the second sub display area 38 or 39 can be quickly displayed in an enlarged size on the main display area 37, so these buttons 52 and 53 are very convenient for the sake of confirming the detail of the small images.

The main control command display area 40 displays a read-in button 55, a pasting button 56 and a print button 57. By clicking on the read-in button 55, image data is read out through the card reader 13, or the reflective scanner 14, or the film scanner 15. The read-in button 55 doubles as a selection button, and servers as the selection button if any image is read in the personal computer 12, and is used for selecting the image to synthesize from among the thumbnails 48a to 48c displayed on the second sub display area 39. In that case, an indicia "SELECT" is displayed on this button 55 instead of "READ-IN". When an image is read in through the file reader 22, the monitor 11 displays the preview image at a low resolution, i.e. with a reduced pixel number per unit area, by decimating the pixels of the image in the same way as for the thumbnails.

The pasting button 56 is operated to paste a selected image in the template image 47 as displayed on the first sub display area 38. In that case, the selected image is pasted as a whole, or after being cropped. While the card reader 13 is selected as the image input device, the full-dress image data of the selected image starts being read out from the storage card in response to the operation on the pasting button 56, and the resolution converting section 25 converts the resolution of the full-dress image data in a manner as described above. When the image data is read in through the HDD 21 or the file reader 22, the resolution converting section 25 converts the resolution of the image data in the same way as for the card reader 13.

When the scanner 14 or 15 is selected, the input resolution is switched over, so the fine scanning is carried out at the newly set input resolution. The print button 57 is operated to activate the printer 16 to print an image based on the image data as processed for quality control or image synthesizing or the like.

The image quality control area 41 displays control buttons or sliders for manual image quality control, including a print finish designation button 59, a density control slider 60, a color control slider 61, a contrast control slider 62, a sharpness control slider 63, a soft focus effect control slider 64, and a saturation control slider 65. The control buttons are operated by clicking the pointer 44 thereon, whereas the sliders are operated by dragging their knobs to an appropriate position through the mouse 27.

Provided below the image quality control area 41 are a reset button 67 for resetting the previous setup values for the image quality control, a register button 68 for registering setup values for the image quality control, and a call up button 69 for calling up registered setup values. The call up button 69 allows to use the setup values for the image quality control repeatedly after once they are setup, and thus improves work efficiency.

Below these buttons for the image quality control, there are provided an image turning button 71 for turning the image through an angle of 90 degrees on the main display area 37, an image reverse button 72 for reversing the image on the main display area 37 left-to-right, a free cropping button 73 for changing aspect ratio of a crop boundary, a boundary turning button 74 for turning the direction of the crop boundary through 90 degrees, and a reset button 75 for canceling designation of a cropping area by the crop boundary.

The menu selection display area 43 displays a service menu button 77, an input selection button 78, an input size button 79, a print size button 80, a zoom button 81 and a print number button 82. As shown for example in FIG. 7, a menu option list 77a pops up from the service menu button 77 upon clicking on the service menu button 77. By clicking on one of the menu options, the image processing software is switched to a job mode corresponding to the selected menu option. As exemplars of job modes selectable by the service menu button 77, the present embodiment offers a digital camera index mode, a digital camera processing-printing mode, an album mounting mode, an ID photo mode, and a batch printing mode.

The digital camera index mode is selected to produce an index print, wherein all of images which are recorded on a storage card and read out through the card reader 13 are printed on a sheet of recording paper, after being reduced in size and arranged in a matrix. Different kinds of templates are prepared for this mode, and is selected according to the number of images to be contained in an index print.

The digital camera processing-printing mode is selected when it is necessary to print out hard copies of the processed image data immediately after the image data picked up through a digital still camera is processed. In this mode, a template with four frames is used for a A4 size recording sheet, and a template with two frames is used for a A5 size recording sheet.

The album mounting mode is for printing a plurality of images on a recording sheet in appropriate layout and arrangement, just like the mounting on an album. So a file of these recording sheets serves directly as an album. Also for this mode, some templates are prepared. For example, there are a template for arranging four images of the same size on one sheet, a template for arranging one large image and two smaller images on one sheet, and a template for arranging a couple of large images on one sheet.

In the ID photo mode, ID photographs for many kinds of official application papers may be produced. For the ID photo mode, a variety of templates, including those for the driver's license and for the passport, are previously stored.

Data of these templates is stored in the HDD 21, so the data of the selected template is read out from the HDD 21 and is written on the RAM 20. Even after the image synthesizing, the template data is stored separately from the image data. This is for reducing the number of steps for the image processing that is required when the position or the size of any of the pasting frames of the template is modified after the image is pasted, and thus for speeding the image editing operation.

In other words, if the position or the size of any of the pasting frames of the template is modified after these images are synthesized and the image data and the template data are combined and stored as a set of data, it would be necessary to read out the template data and the image data again, and repeat the image synthesizing process from the beginning. On the contrary, where the image data and the template data are stored separately in correlation to each other, if the position or the size of any of the pasting frames of the template is modified, the template data may be modified correspondingly without the need for reading out the image data or the template data again.

If, for instance, the size of one frame is enlarged 5% after an image is pasted therein, the resolution would be decreased with the enlargement since the resolution of the image data of the pasted image has always been converted. However, the enlargement of 5% has little influence on the quality of the printed image. On the other hand, if the size of the pasting frame is doubled, the image data is read out again and the resolution of the image is converted to be suitable for the output resolution of the printer.

The batch printing mode is for printing a plurality of images on the basis of image data for the batch processing that has been stored in the batch processing holder 21a of the HDD 21.

The input selection button 78 is operated to select the input device for inputting the image data and also to designate the sort of the original. A list of selectable input devices and different sorts of originals pops up from the input selection button 78 upon clicking on the input selection button 78. As the selectable input devices, those connected to the imaging system 10 are listed up, i.e. the card reader 13, the reflective scanner 14, the film scanner 15 and the file reader 22 in the present embodiment. As the selectable sorts of originals, a photo-print, a printed matter, an instant photograph, a negative photo film, a positive photo film, and so forth are displayed. When one sort of the originals is selected by the input selection button 78, a suitable image input device for this sort of original is automatically selected. For example, if the photo-print or the printed matter is selected, the reflective scanner 14 is automatically selected as the image input device. If the negative film or the positive film is selected, the film scanner 15 is automatically selected.

Then, the color correction circuit and the gradation correction circuit of the image processing section 23 carry out proper corrections on the input image data, taking the properties of the used image input device and the sort of the original into consideration. It is possible for the operator to register other kinds of originals and image input devices.

The input size button 79 is used for entering the size of an original when the original is to be scanned through the reflective scanner 14. A list of size options for the original pops up from the input size button 79 upon clicking on this button 79, so the operator may select the size of the original. Then, the reflective scanner 14 scans a range determined by the selected size of the original.

The print size button 80 is operated for selecting the sheet size of recording paper for printing, or for selecting a template. Upon clicking on the print size button 80, a list 80a of paper size options and template options pops up from this button 80, as shown for example in FIG. 8.

Since there are a large number of templates stored in the imaging system 10, the template options in the popping up list 80a from the print size button 80 is switched over according to the job mode selected by the service menu button 77. For example, those templates having a lot of frames and usable for the index printing are listed up in the digital camera index mode, whereas those templates for the driver's license, the passport and other kinds of ID papers are listed up in the ID photo mode.

Figure 8:
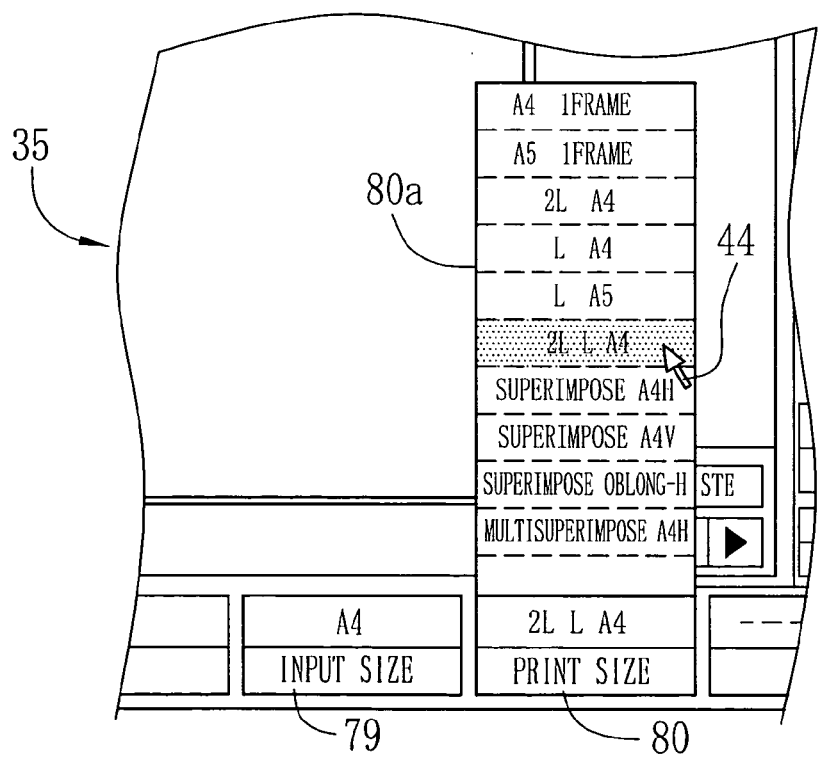
FIG. 8 is an explanatory diagram illustrating a template list displayed for selecting a template on the control screen.

FIG. 8 shows the paper size and template options included in the template list 80a in the album mounting mode, which are "A4 1 Frame" "A5 1 Frame", "2L A4", "L A4", "L A5", "KG A4", "Superimpose A4 Horizontal", "Superimpose A4 Vertical", "Superimpose Oblong A4 Horizontal" and "Multi-superimpose A4 Horizontal".

Figure 9A:
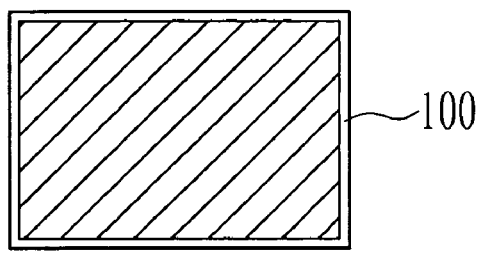
FIGS. 9A, 9B, 9C, 9D, 9E and 9F are explanatory diagrams illustrating examples of templates available in an album mounting mode.
Figure 9B:
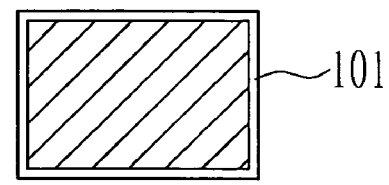
Figure 9C:
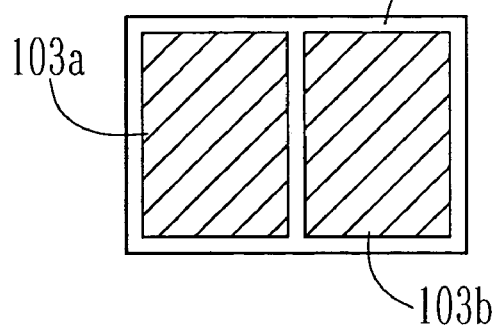
Figure 9D:
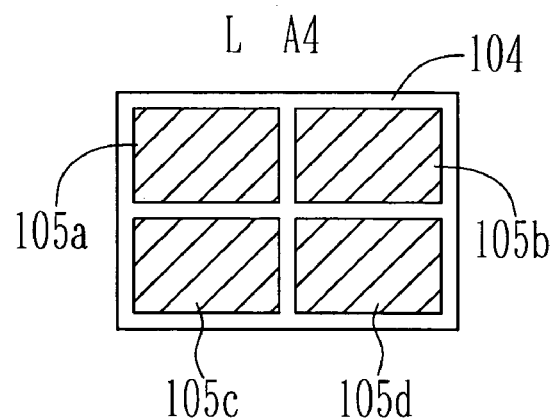
Figure 9E:
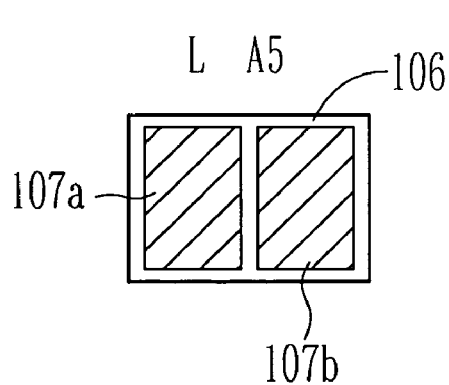
Figure 9F:
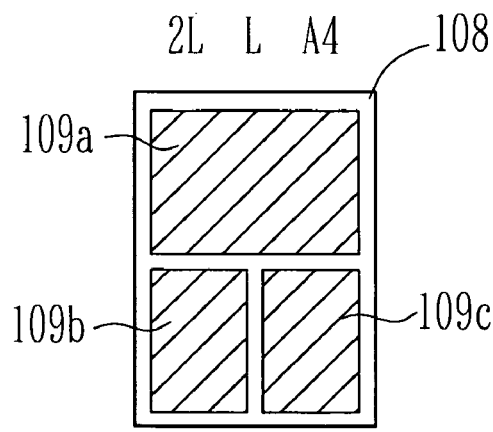

As shown in FIGS. 9A and 9B, a single frame is printed on the almost entire area of a A4 size sheet 100 when the option "A4 1 Frame" is selected, and a single frame is printed in the almost entire area of a A5 size sheet when the option "A5 1 Frame" is selected. When the option "2L A4" is selected, two L-size frames 103a and 103b are printed on a A4 size sheet 102, as shown in FIG. 9C. When the option "L A4" is selected, four L-size frames 105a, 105b, 105c and 105d are printed on a A4 size sheet 104, as shown in FIG. 9D. The option "L A5" is for printing two L-size frames 107a and 107b on a A5 size sheet 106, and the option "2L L A4" is for printing a 2L size frame 109a and a couple of L size frames 109b and 109c on a A4 size sheet 108, as shown in FIGS. 9E and 9F.

Figure 10A:
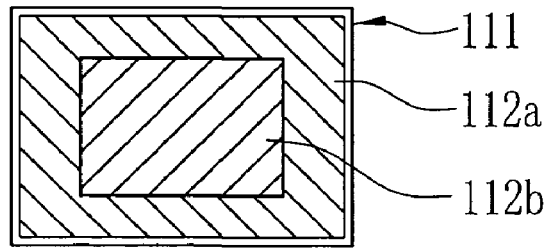
FIGS. 10A, 10B, 10C and 10D are explanatory diagrams illustrating examples of other templates available in an album mounting mode.
Figure 10B:
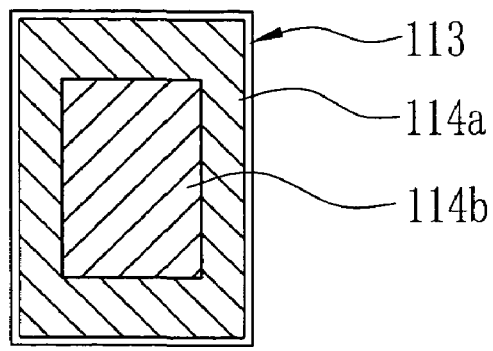
Figure 10C:
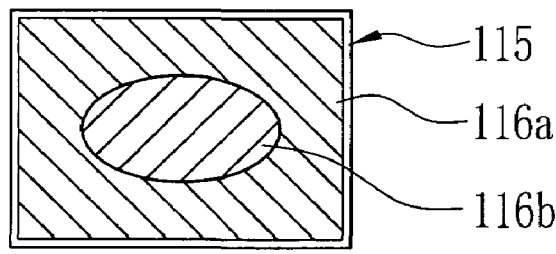

With the template "Superimpose A4 Horizontal", an image is printed as a background image 112a on the almost entire area of a horizontally elongated A4 size sheet 111, and then an image is superimposed as a main image 112b on the background image 112a, as shown in FIG. 10A. With the template "Superimpose A4 Vertical", an image is printed as a background image 114a on the almost entire area of a vertically elongated A4 size sheet 113, and then an image is superimposed as a main image 114b on the background image 114a, as shown in FIG. 10B. The template "Superimpose Oblong A4 Horizontal" is for superimposing an oblong main image 116b on a background image 116a that is printed on the almost entire area of an horizontally elongated A4 size sheet 115, as shown in FIG. 9C. The template "Multi-superimpose A4 Horizontal" is for superimposing a plurality of main images 118b and 118c on a background image 118a that is printed on the almost entire area of an horizontally elongated A4 size sheet 117, as shown in FIG. 9D.

Besides the above templates, there are many other templates for superimposing, for different sizes of recording sheets, including L size, 2L size, A5 size, A5W size and A4W size, and different printing directions.

It is possible to select the template in other ways than the above procedure. For example, it is possible to display samples of the templates on the main display area 37, wherein each sample shows an outline of one template in a reduced size. This configuration permits selecting the template just by clicking on one of samples, while visually confirming the outlines and layouts of the template options.

When the recording sheet size and the template are selected on the print size button 80, a crop boundary 84 specific to the selected paper size or the template is displayed on the image 46 to synthesize that has been selected and displayed on the main display area 37, as shown in FIG. 4. The crop boundary 84 is provided with a triangular mark 84 that indicates an upper side of the crop boundary 84. By gripping this mark 84 through the mouse 27, the crop boundary 84 may be moved on the image 46 to synthesize. Also by gripping and moving one side or one corner of the crop boundary 84, the crop boundary 83 may be reduced or enlarged.

When the selected template is for pasting more than one image, i.e. when the template image 47 includes a plurality of pasting frames, e.g. 49a to 49c, the crop boundary 84 has a similar shape to one of those frames. That is, the crop boundary 84 has the same aspect ratio as the aspect ratio of the chosen frame. The presently chosen frame is shown by a bold line on the first sub display area 38. The crop boundary 84 is normally enlarged or reduced while keeping the same aspect ratio as the chosen frame of the selected template. After bounding an area of the image 46 with the crop boundary 84 in this way, the pasting button 56 is operated to paste the bounded area in the chosen pasting frame 49a, 49b or 49c of the template image 47 on the first sub display area 38.

The zoom button 81 is for zooming the image up and down on the main display area 37. The print number button 82 is for designating the number of copies to print. These operation buttons 77 to 82 are each divided into upper and lower halves, and the allocated function is indicated on the lower half, whereas the presently selected option is indicated on the upper half.

The message display area 42 displays messages relating to the presently executed operation or job, information on the operation or the job that can be executed next, or hints for the next operation. The message display area 42 also displays an appropriate error message in case of necessity.

Figure 11:
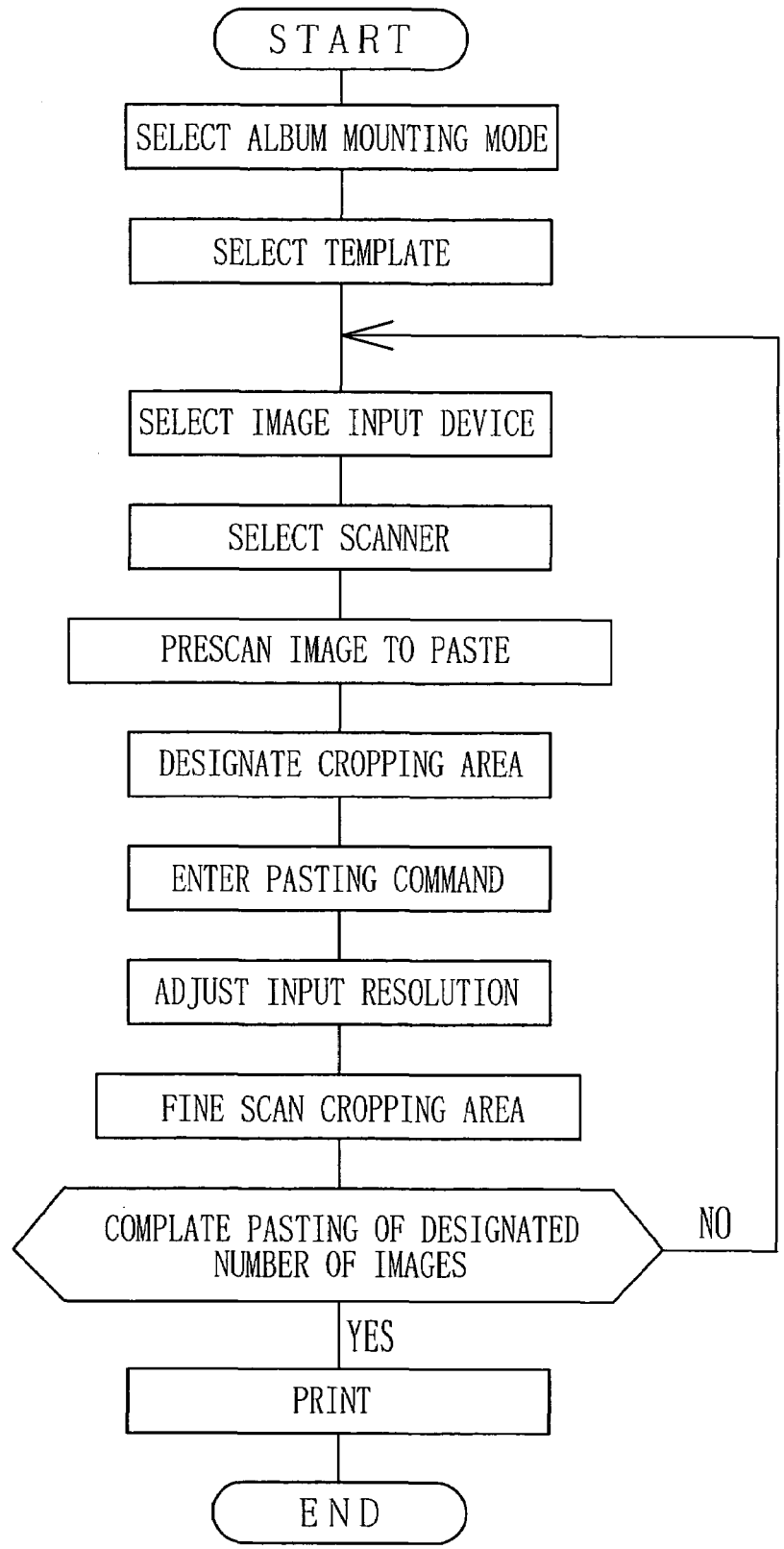
FIG. 11 is a flow chart illustrating an operation sequence in the album mounting mode where a scanner is selected as an image input device.

Now the operation of the imaging system 10 of the present embodiment will be described with reference to the flow chart of FIG. 11. The following description relates to a case where the template "2L L A4" is selected in the album mounting mode, for synthesizing three images whose image data is read out through the reflective scanner 14.

Upon turning on the imaging system 10, the imaging software is automatically started up in the personal computer 12. At the first stage of starting up the imaging software, any image is not displayed on the main display area 37, the first sub display area 38 and the second sub display area 39, as shown in FIG. 3.

Figure 7:
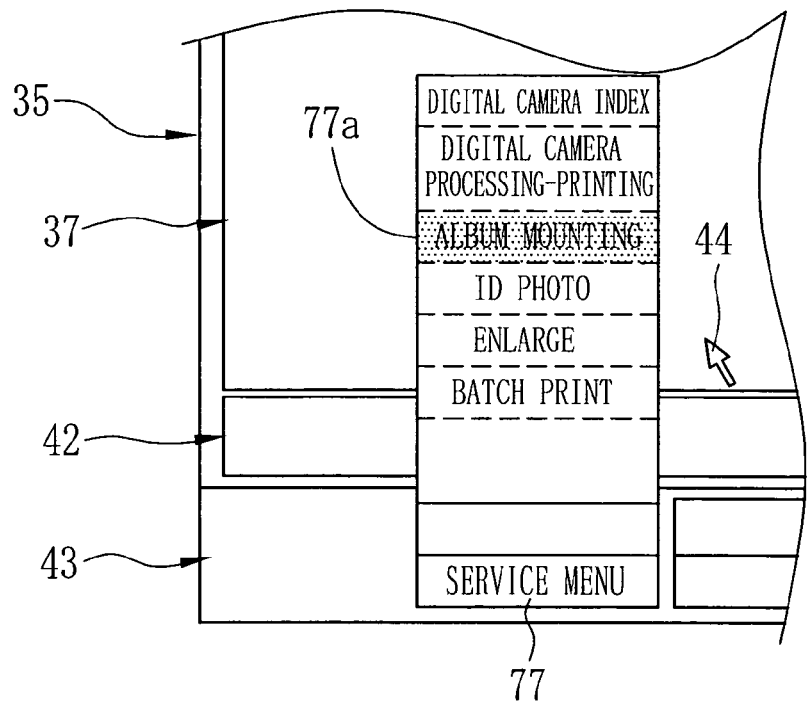
FIG. 7 is an explanatory diagram illustrating a menu list displayed for selecting a service menu on the control screen.

The operator clicks on the service menu button 77 of the menu selection display area 43 by use of the mouse 27 or the control panel 28, and select one of the menu options listed in the popped up menu list 77a, as shown in FIG. 7. In this instance, the album mounting mode is selected. Then, the selected mode is displayed on the service menu button 77.

Next, the operator clicks on the input selection button 78 of the menu selection display area 43, to select the kind of the original to scan or the input device from among the options listed in the popped up list. For example, if the photo-print is selected, the reflective scanner 14 is automatically selected as the suitable image input device for reading out an image from the photo-print.

When the reflective scanner 14 is selected by the input selection button 78, the input size button 79 gets effective. With the input size button 79, the scanning area to scan by the reflective scanner 14, that is, the size of the reflective original is designated.

The print size button 80 of the menu selection display area 43 is operated for selecting the print size and the template. Upon clicking on the print size button 80, the list 80a of available templates is displayed, as shown in FIG. 8. In this instance, the template "2L L A4" as shown in FIG. 9F is selected.

When the template is selected, the template image 47 corresponding to the selected template is displayed on the first sub display area 38, as shown in FIG. 5. If the selected template has a plurality of frames, like the chosen template "2L L A4", one of the frames is shown by the bold line to indicate the first frame in which an image is to be pasted first. In this instance, the first pasting frame 49a is displayed boldly.

Thereafter, a photo-print containing the image to scan is placed in the reflective scanner 14. Since the reflective scanner 14 is of the flat head type in the present embodiment, the photo-print is positioned on a stage of the reflective scanner 14, and is held flat and fixed in this position by closing a cover to sandwich the original between the stage and the cover.

When the read-in button 55 of the main control command display area 40 is operated after placing the reflective original in the reflective scanner 14, the personal computer 12 drives the reflective scanner 14 to read the image of the photo-print, and output image data of the read image to the personal computer 12 through the SCSI interface 30, and is sent to the image processing section 23 having the color correction circuit and the gradation processing circuit.

In the image processing section 23, the color correction circuit controls the color balance of the input image, taking different spectral characteristics of the reflective scanner 14, by carrying out γ-correction on red, green and blue (RGB) color signals of the image data with correction coefficients that are predetermined for the reflective scanner 14. The gradation processing circuit corrects gradation of the image data by use of the look-up tables (LUT) which are prepared for the respective color materials read out through the reflective scanner 14, such that the gradation is well reproduced by the printer 16.

On the basis of the image data read out through the reflective scanner 14 and processed through the image processing section 23, the image 46 to synthesize first is displayed in the main display area 37 on the control screen 35, as shown in FIG. 4. Simultaneously, the crop boundary 84 is displayed on the image 46 in the same aspect ratio as the outer frame 47a. Image quality of the image 46 as displayed on the main display area 37 may be controlled by operating the control buttons and sliders on the image quality control area 41.

Then the operator may move the crop boundary 84 on the image 46 or enlarge or reduce the crop boundary 84, to designate an area of the image 46 to paste in the first pasting frame 49a. In this instance, the aspect ratio of the crop boundary 84 is maintained equal to the aspect ratio of the first pasting frame 49a, and the entire area of the first image 46 to synthesize is bounded by the crop boundary 84.

When the pasting button 56 of the main control command display area 40 is operated after the cropping area is designated, the reflective scanner 14 scans the photo-print in the fine scanning mode, i.e. at the high resolution. In the fine scanning mode, the CPU 18 calculates the optimum resolution of the image data suitable for the output resolution of the printer 16 on accordance with the size of the cropping area and the print size of the cropping area, i.e. the size of the first pasting frame 49a. Since the designated cropping area is of A4 size (296 mm×210 mm), and the first pasting frame 49a is of 2L size (178 mm×127 mm), the optimum resolution is 400 dpi×178/296=240 dpi, assuming that the output resolution of the printer 16 is 400 dpi.

Then, the CPU 18 selects the value "250 dpi" as the nearest value to the optimum resolution "240 dpi" from the first LUT 26a, and sets the input resolution of the reflective scanner 14 at this value. Image data obtained by the fine scanning is fed to the personal computer 12 through the SCSI interface 30, and is written on the RAM 20. Since the input resolution is adjusted to the optimum resolution of the image data for printing, the quality of the image obtained by scanning is optimized for printing. Also the memory capacity of the RAM 20 is not overused. The risk of calculation of the optimum resolution or improper setting of the input resolution is reduced to the minimum.

After being written on the RAM 20, the image data is sent to the image synthesizing section 24. The image synthesizing section 24 crops out an image of the cropping area of the image 46 that is bounded by the crop boundary 84, and pastes the cropped image in the first pasting frame 49a of the selected template 47. It is to be noted that the image quality may be corrected even after the image is pasted in the template. In that case, the pasting button 56 is operated after the image control, so the image data is corrected with correction parameters as designated by the image control. Since the image data and the template data are stored separately, the image data can be corrected with ease.

Figure 12:
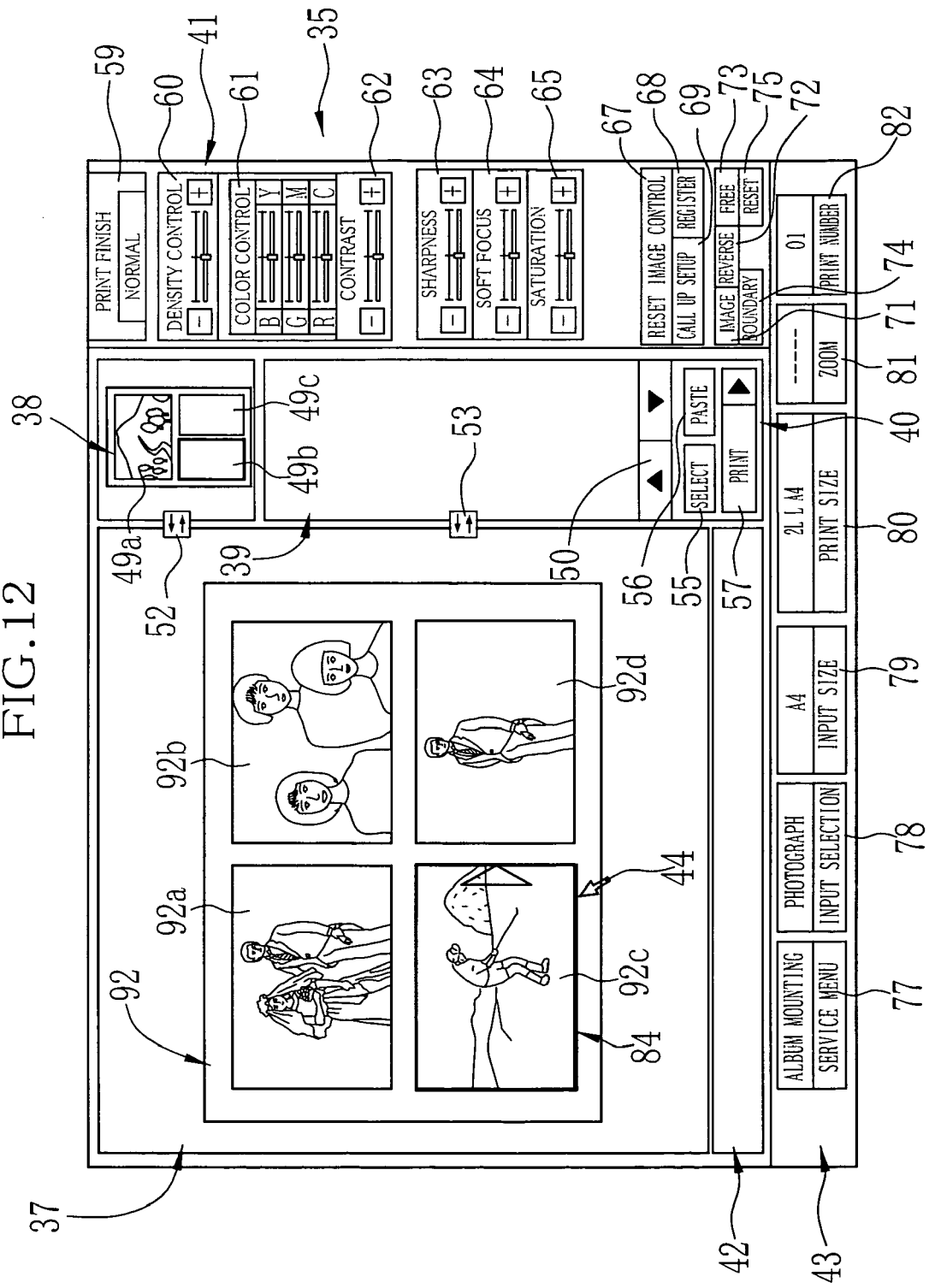
FIG. 12 is an explanatory diagram illustrating an example of display condition on the control screen when a second image to paste is selected.

When the image is pasted in the first pasting frame 49a, the second pasting frame 49b is automatically selected and displayed boldly. Then, the operator sets a second original as having an image to paste in the second pasting frame 49b. For example, an A4 size original containing four images of L size in a matrix is set in the reflective scanner 14. Upon clicking on the read-in button 55, the reflective scanner 14 makes pre-scanning, so the image 92 of the second original is displayed on the main display area 37, as shown in FIG. 12. The crop boundary 84 changes its size and aspect ratio in correspondence with the second pasting frame 49b, and is displayed on the image 92. Then, the operator selects one of the four image frames 92a, 92b, 92c and 92d by placing the crop boundary 84 thereon. In this instance, the image frame 92c is selected. Upon clicking on the pasting button 56, the reflective scanner 14 makes fine-scanning to paste the image 92c in the second pasting frame 49b. At that time, the input resolution setting section 26 automatically set the input resolution of the reflective scanner 14 in accordance with the size of the image to paste and the print size of the selected pasting frame. Since both the size of the image to paste and the print size are L size, the optimum resolution of the image data for printing is 400 dpi×127/127=400 dpi, so the input resolution setting section 26 selects the value "400 dpi" from the first LUT 26a. So the reflective scanner 14 scans with this input resolution only a fragment of the original that corresponds to the selected image frame 92c that is determined on the basis of cropping data from the personal computer 12. The image data of the image frame 92c is pasted in the second pasting frame 49b after being subjected to the image quality correction process and the like.

Figure 13:
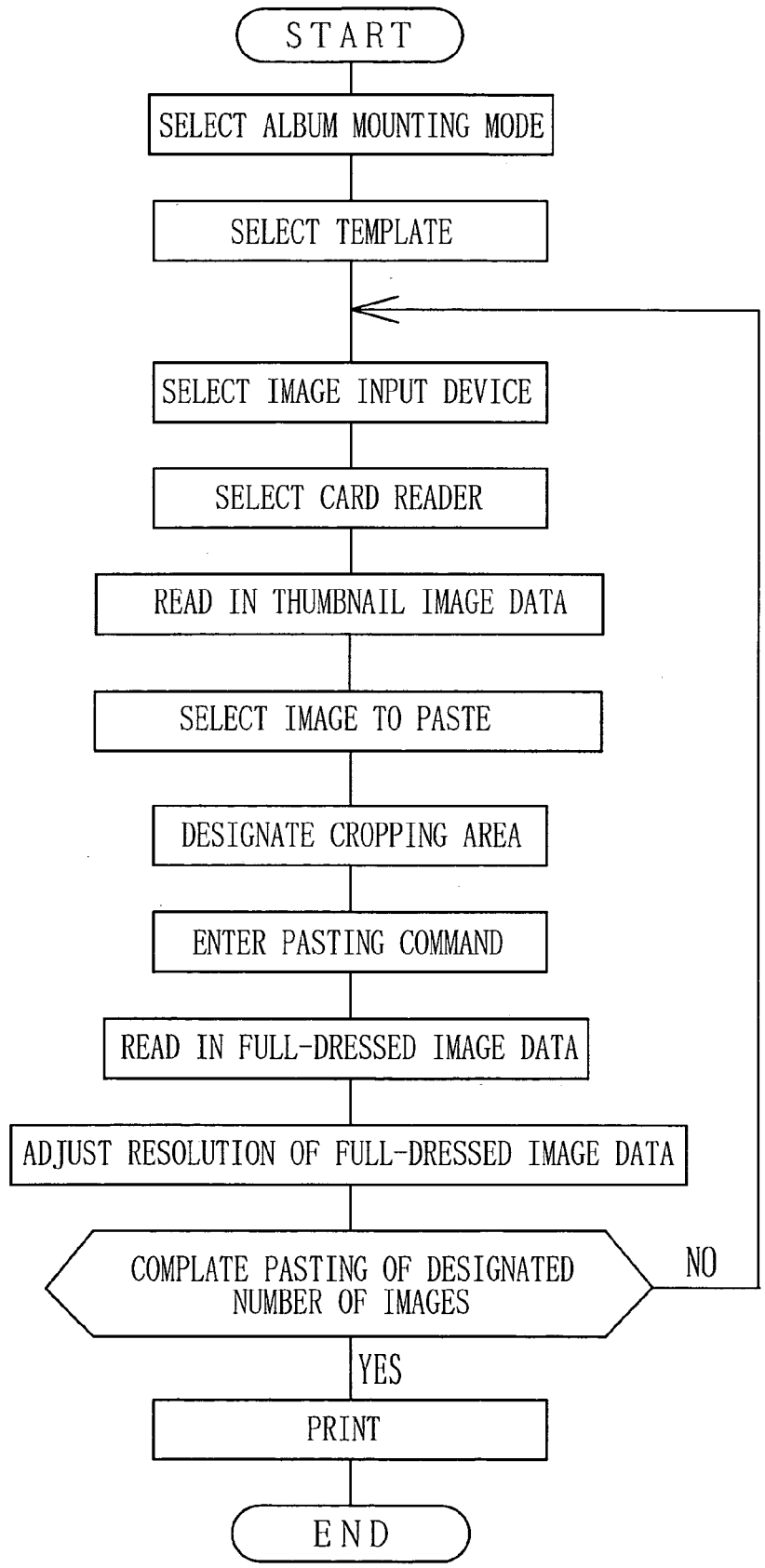
FIG. 13 is a flow chart illustrating an operation sequence in the album mounting mode where a card reader is selected as an image input device.
Figure 14:
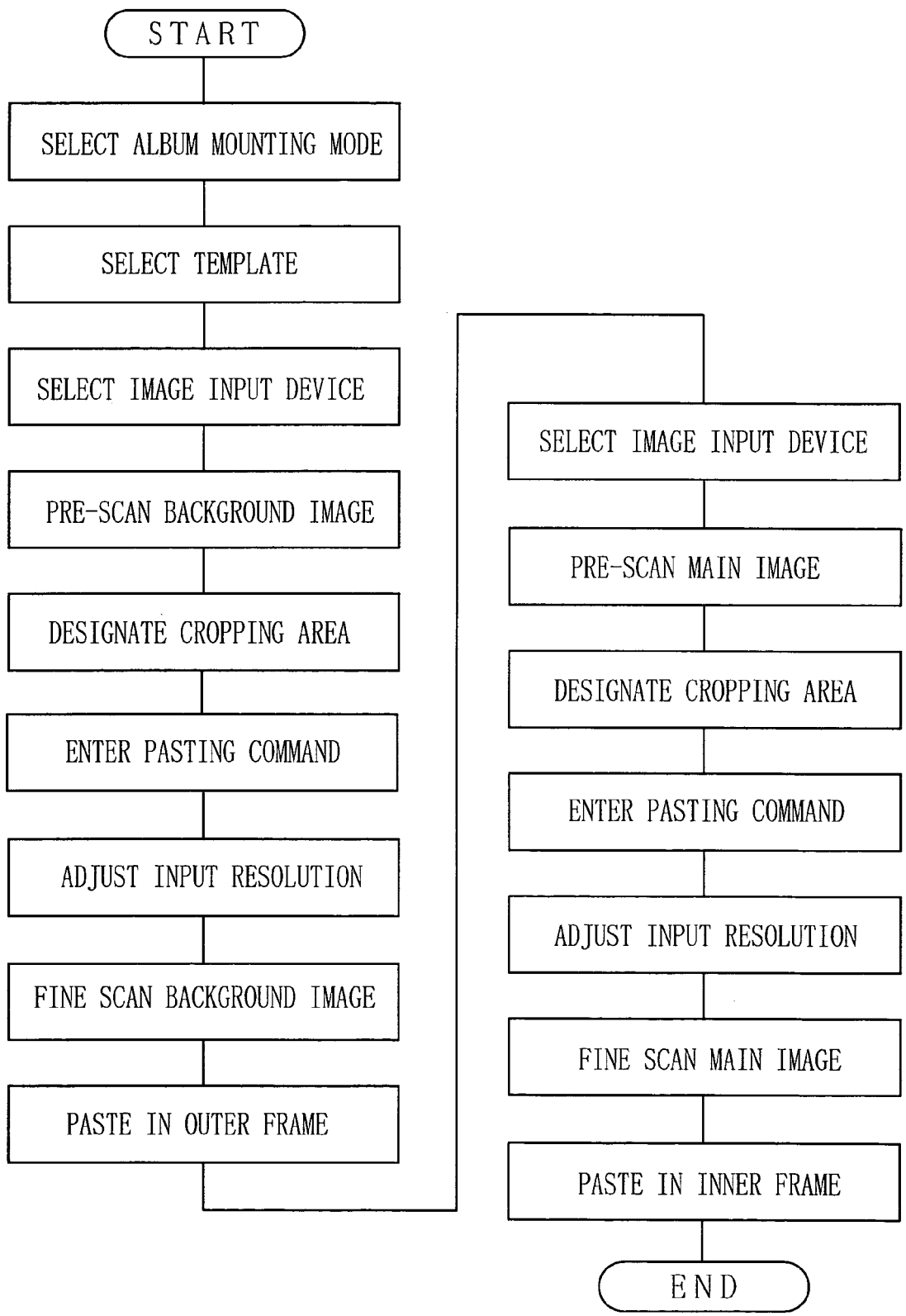
FIG. 14 is a flow chart illustrating an operation sequence for a superimposing process.

Thereafter, pasting process for pasting a third image in the third pasting frame 49c is carried out. In this instance, the image to paste in the third pasting frame 49c is selected from among those images which are photographed through a digital still camera. So the storage card having image data of these images is set in the card reader 13, and then the input selection button 78 is operated to select the digital still camera, as shown in the flow chart of FIG. 13. Thereafter when the read-in button 55 is operated, the image data is read out from the storage card into the personal computer 12, so the images photographed through the digital still camera are displayed as thumbnails 48a, 48b and 48c, as shown in FIG. 6.

The operator clicks on one of the thumbnails, the thumbnail 48b in this instance. Then, the image of the selected thumbnail is displayed as a third image 88 in a large size on the main display area 37, and the crop boundary 84 corresponding to the third pasting frame 49c is displayed on the third image 88.

The operator may change the position and the size of the crop boundary 84 relative to the image 88 to designate an area to be pasted in the third pasting frame 49c. After the cropping area of the second image 88 is designated in this way, the pasting button 56 of the main control command display area 40 is operated to read out the full-dress image data of the third image 88 from the storage card, and write it on the RAM 20. Thereafter, image data of the cropping area of the third image 88 that is bounded by the crop boundary 84 is extracted and sent to the resolution converting section 25.

The resolution converting section 25 converts the resolution of the extracted full-dress image data to be equal to the output resolution of the printer 16 in accordance with the size of the cropping area and the size of the third pasting frame 49c. After this resolution conversion, the image data is subjected to the image quality correction process, and then pasted in the third pasting frame 49c.

After finishing synthesizing the images, it is possible to check the subsequent synthetic image in an enlarged size on the main display area 37 by operating the first display interchange button 52 to interchange the display contents between the main display area 37 and the first sub display area 38. The display interchange operation between the main display area 37 and the first or the second sub display area 38 or 39 may also be carried out at appropriate timing during the image synthesizing.

The finished synthetic image may be printed out by operating the print button 57 of the main control command display area 40. Upon the print button 57 being operated, the image data written on the RAM 20 is fed to the printer 16, so the printer 16 converts the image data into print data. Since the printer 16 is for the heat-developing photosensitive material in this embodiment, the printer 16 prints the synthetic image by projecting three-color laser beams onto a heat developing photosensitive material. Thereafter the heat developing photosensitive material having the image recorded thereon is overlaid on a photoreceptive material added with water, and is heated together, to form the recorded image as a positive image on the photoreceptive material. The photosensitive material is removed from the photoreceptive material, and the photoreceptive material having the positive image printed thereon is ejected as a hard copy of the synthetic image from the printer 16.

It is possible to use a mono-sheet type heat-developing photosensitive material wherein a photosensitive material develops a positive image thereon when heated after being exposed. The photosensitive material may be a silver halide photosensitive material or a photosensitive polymer sheet.

It is possible to store image data of the synthetic image 89 in the batch processing holder 21*a* of the HDD 21 without printing a hard copy of the synthetic image 89 for the present.

Figure 15:
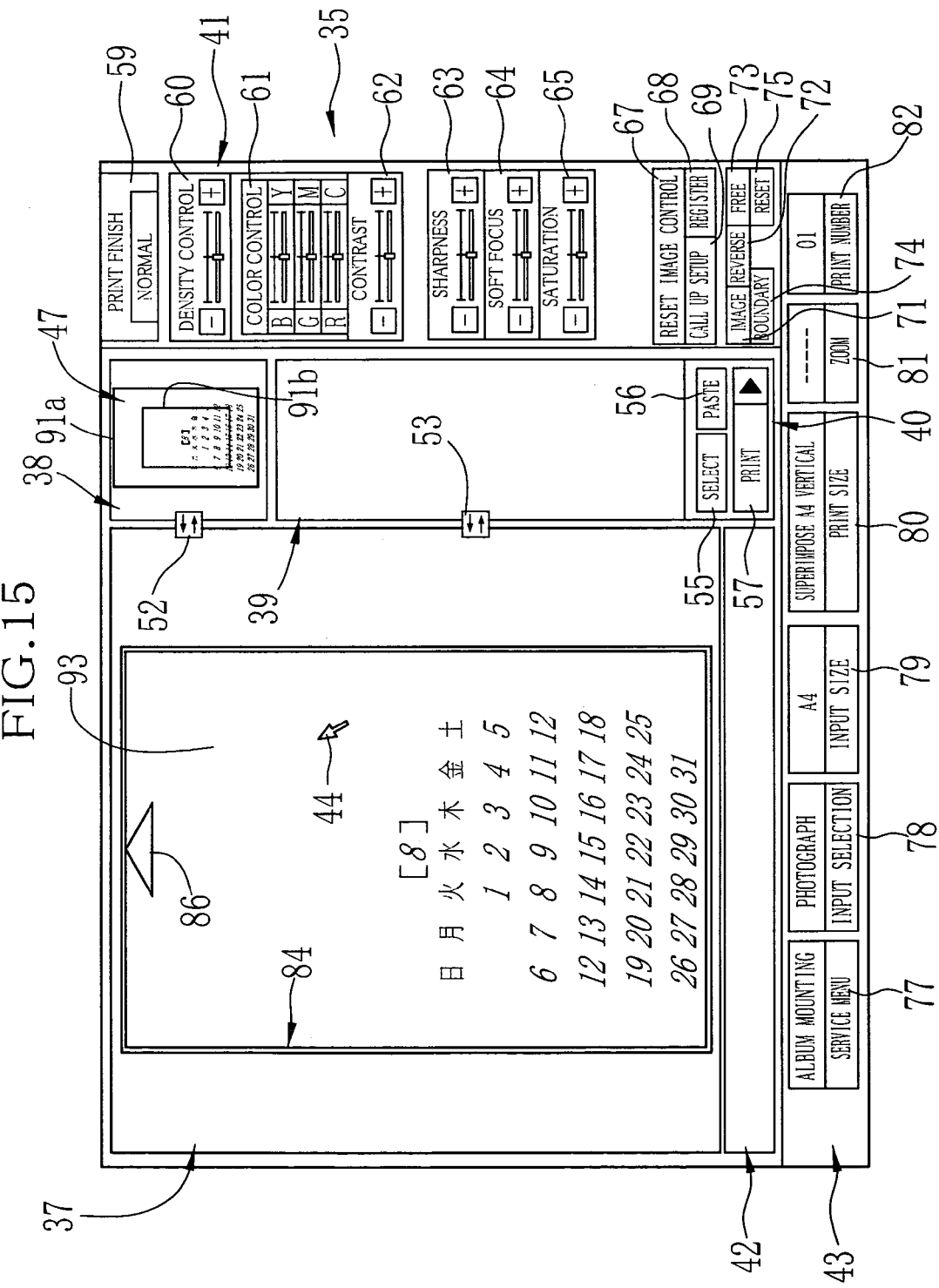
FIG. 15 is an explanatory diagram illustrating an example of display condition on the control screen when a background image is entered for the superimposing process.

Now a second example of operation of the imaging system of the present invention will be described with reference to FIGS. 14 to 17. In the second example, the template "Superimpose A4 Vertical" is selected in the album mounting mode, and a background image containing a calendar is read in through the reflective scanner 14, and a main image to be superimposed on the background image is read out through the film scanner 15. FIG. 15 shows a display condition where the reflective scanner 14 has made pre-scanning of the original for the background image, so the image 93 of the pre-scanned original is displayed on the main display area 37. After a cropping area of the image 93 is designated by the crop boundary 86, the cropping area is pasted in an outer frame 91*a* of a template image 47 on the first sub display are 38. When pasting the cropping area, the input resolution of the reflective scanner 14 is set up in accordance with the size of the cropping area and the size of the outer frame 91*a*, so the reflective scanner 14 makes fine-scanning at this input resolution.

Figure 16:
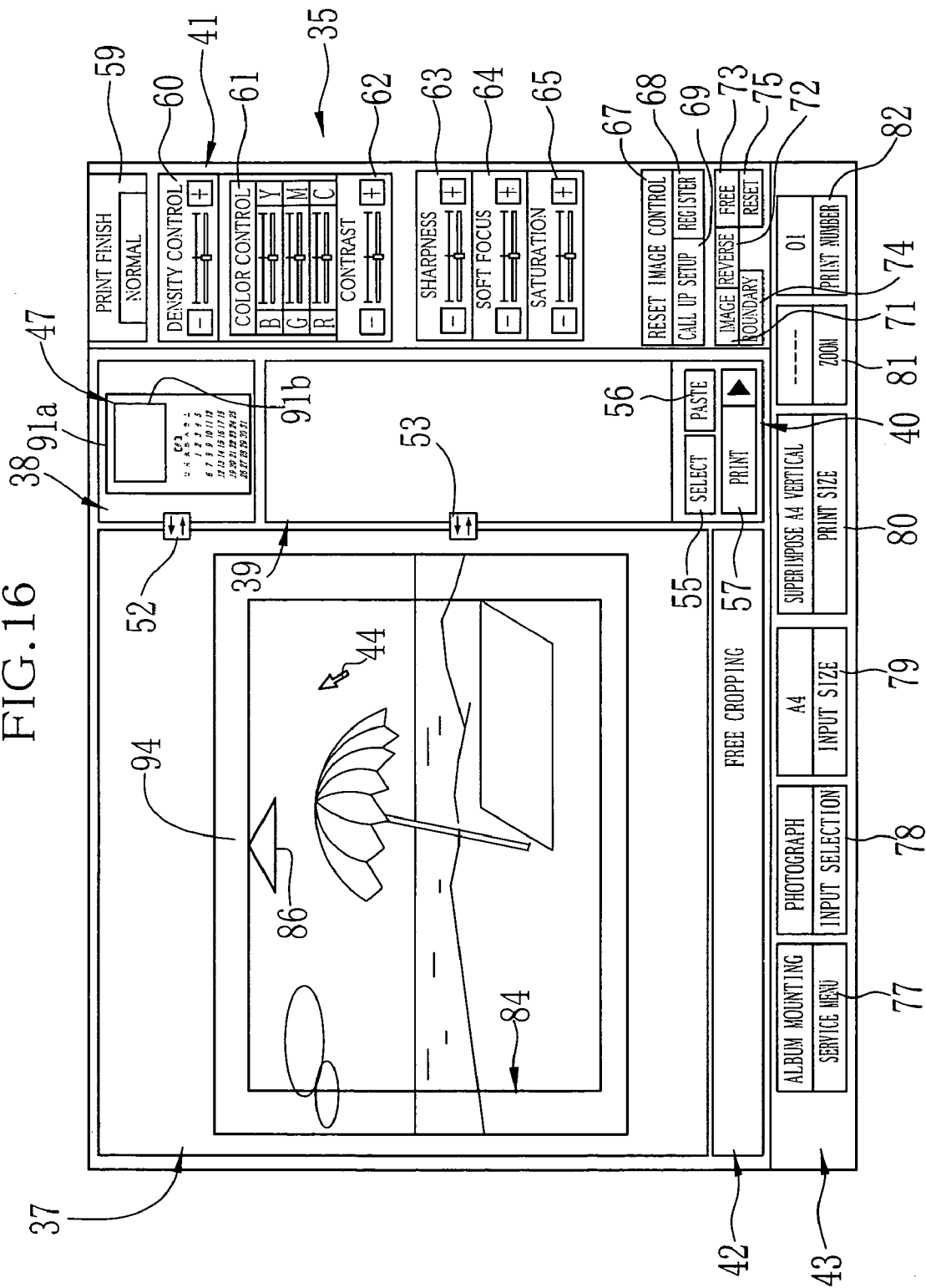
FIG. 16 is an explanatory diagram illustrating an example of display condition on the control screen when a main image is selected after the background image is pasted in an outer frame of a template for the superimposing process.

After the background image is thus cropped and pasted in the outer frame 91*a*, an inner frame 91*b* is automatically selected and changed to be the bold line in the first sub display area 38. Then, the operator places a negative film with the main image in the film scanner 15, and clicks on the read-in button 55, so the film scanner 15 makes pre-scanning to read in the main image at a low input resolution. As a result, the main image 94 is displayed on the main display area 37, as shown in FIG. 16.

The operator may adjust the position and the size of the inner frame 91*b* so as not to interfere with the essential content of the background image. At that time, the aspect ratio of the crop boundary 84 may be changed by operating the free cropping button 73. For example, as shown in FIG. 16, where the template "Superimpose A4 Vertical" is originally selected, the crop boundary 84 is changed to be a horizontally elongated shape after clicking on the free cropping button 73. Thereafter, upon double-clicking in the first sub display area 38, the inner frame 91*b* of the template image 47 on the first sub display area 38 is changed to have a new aspect ratio corresponding to the aspect ratio of the crop boundary 84. Thus, the operator can check the balance in position and size between the inner and outer frames 91*a* and 91*b*.

When the paste button 56 is clicked after designating a cropping area of the main image 94, the film scanner 15 makes fine-scanning at an input resolution that is determined by the size of the cropping area of the main image 94 and the size of the inner frame 91*b*. Thus, the cropping area of the main image 94 is pasted in the inner frame 91*b*, as shown in FIG. 17.

If there is a difference in image resolution between the background image and the main image, the image of the lower resolution looks still more rough and inferior. This is impermissible especially when the resolution of the main image is lower than that of the background image. For this reason, the resolution of the main image to be pasted in the inner frame 91*b* is preferably changed to be equal to that of the background image as pasted in the outer frame 91*a*, prior to the pasting of the main image. It is also preferable to make the resolution of the main image slightly higher than that of the background image. For adjusting the resolution in this way, a manual resolution control mode should be provided in addition to the automatic resolution adjusting mode.

When the operator wants to change either the background image or the main image after they are pasted in the outer and inner frames 91*a* and 91*b*, the operator selects the inner or outer frame in which the image to be changed, by clicking on the frame in the first sub display area 38, and then selects or inputs another image to have that image displayed on the main display area 37. Thereafter, a cropping area of the new image is designated by the crop boundary 84, and the pasting button 56 is operated, in the same way as described above. Thereby, a newly cropped image is read in with the optimum input resolution, and is pasted in the selected frame in place of the previously pasted image.

The operator may change the position and the size of the inner frame 91*b* relative to the outer frame 91*a* even after the second image 94 is pasted therein, by gripping one side or corner of the inner frame 91*b*. In that case, the inner frame 91*b* maintains its the aspect ratio while it is enlarged or reduced, so the pasted image would not be deformed or partly cut away.

It is also possible to send the image data of the synthetic image to other imaging system that is connected to the imaging system 10 through the LAN or the Internet, by storing it in the shared holder 21*b* of the HDD 21. To store the synthetic image in the shared holder 21*b*, the inner frame image is merged in the outer frame image to store as a single synthetic image file.

Figure 10D:
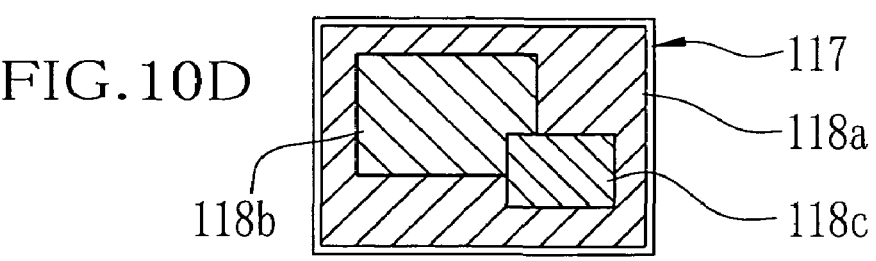

Although a single main image is superimposed on a background image in the second example, if there are a plurality of main images to be superimposed on one another on the background image, e.g. where the template "Multi-superimpose A4 Horizontal" as shown in FIG. 10D is selected, a second main image is cropped and pasted in a second inner frame, after a first main image is cropped and pasted in a first inner frame in the same way as described above. Where there are a plurality of inner frames which overlap with each other, the lately pasted image is usually displayed and printed in front of the previously pasted image. However, which of the inner frame images is to be placed forward may be modified appropriately.

When a synthetic image having a plurality of main images which overlap with each other is stored in the batch processing holder 21*a*, data showing the sequence of arrangement of the main images from the front should be allocated to the image data. It is preferable to store the sequence data along with the location data that represents the positions of the inner frames relative to the outer frame.

It is possible to paste the background image as an oblong image in the outer frame in the same way as for the inner frame. Beside the oblong trimming frame, the inner frame or the outer frame may be of a round shape, a triangular shape, a star-like shape, a lozenge shape, a heart shape, or a polygonal shape, e.g. a pentagonal shape or a hexagonal shape. In those cases, the crop boundary has a corresponding shape to the inner frame.

In the above embodiment, the input resolution of the reflective scanner 14 or the film scanner 15 is determined to be the nearest value to an optimum value that is calculated on the basis of the image reduction or magnification rate and the output resolution of the printer. However, the input resolution may be selected to be a higher value than the optimum value from among nearer values to the optimum value, for the sake of putting priority on the image quality.

On the contrary, in order to put priority to the scanning speed, the input resolution may be selected to be a lower value than the optimum value from among nearer values to the optimum values.

Although the input resolution is selected from among several options in the above embodiment, it is possible to use such a reflective scanner or a film scanner whose input resolution may be adjustable in the unit of 1 dpi, and set the input resolution to be equal to the calculated optimum value.

Where the pasted image can be frequently edited, e.g., the size of the pasting frame is likely to be modified frequently after an image is pasted therein, it is necessary to read in the image data frequently. In those cases, it is preferable to read in the image data at the highest available resolution of the scanner, and store it in the RAM 20, regardless of the size of the cropping area. Then, it would be unnecessary to read in the image data again at a different input resolution even when the size of the pasted image is to be modified. As for the image data read out through the card reader 13, it is possible to store the full-dress image data in the RAM 20 without converting its resolution, and convert the resolution at every editing process.

Although the storage card stores thumbnail image data for the purpose of previewing thumbnails of recorded images in the above embodiment, the storage card does not need to store thumbnail image data. In that case, the card reader may read out the full-dress image data while decimating pixels thereof, and display preview images at a lower resolution.

In the above embodiment, the image to synthesize is selected after the template is selected. But it is also possible to select the image to synthesize before selecting the template. In that case, the image to synthesize is displayed first. Thereafter when the template is selected, the crop boundary is displayed on the image to synthesize.

As the file reader, CD-ROM drive, MO disc drive and other large capacity data storage devices are usable besides the floppy disc drive.

The printer may be digital printers for use with ordinary silver halide photosensitive materials, ink-jet printers, color thermal printers, electronic photography type printer or other printers operating on image signals.

Thus, the present invention is not to be limited to the above embodiment but, on the contrary, various modifications will be possible to those skilled in the art without departing from the scope of claims appended hereto.

What is claimed is:

1. An imaging system comprising:
   an image input device for entering image data from an original image,
   an image processing device for processing said image data to produce an output image,
   an image output device for outputting said output image as a hard copy or as data file,
   a resolution adjusting device for automatically adjusting an input resolution of said image input device in accordance with an output resolution of said image output device, a size or data pixel number of said output image, and a size of said original image, and
   a monitor for displaying a main display area, a first sub display area, and a second sub display area simultaneously, and said main display area displaying an image as entered through said image input device, and a crop boundary on said entered image to designate a cropping area of said entered image, wherein image data of said cropping area is used for producing said output image, said first sub display area displaying a template image of a template that shows a layout for said output image, and said second sub display area displaying a thumbnail image of said entered image.

2. An imaging system as recited in claim 1, further comprising a device for modifying the size or position of said crop boundary on said monitor.

3. An imaging system as recited in claim 2, further comprising a file reader device for reading image data from an image file, wherein said resolution adjusting device converts the data pixel number of said image data read by said file reader device to a value determined according to the output resolution of said image output device, the size or data pixel number of said output image and said cropping area.

4. An imaging system as recited in claim 1, wherein said image input device includes a scanner, and said image output device includes a printer, and wherein said resolution adjusting device calculates an input resolution for said scanner on the basis of an output resolution of said printer, a size of an area to be read out by said scanner from said original image, and a print size of said output image.

5. An imaging system as recited in claim 4, wherein there are a plurality of predetermined input resolutions available for said scanner, and said resolution adjusting device sets said scanner at one of said predetermined input resolutions that is the nearest to said calculated resolution, or a value less than and nearer to said calculated resolution, or a value more than and nearer to said calculated resolution.

6. An imaging system as recited in claim 1, wherein said image processing device produces a synthetic image as said output image from a plurality of images entered through said image input device, by designating said cropping area of each of said original images and pasting said cropping area in a respective one of pasting frames of a template that shows a layout for said synthetic image.

7. An imaging system as recited in claim 6, wherein images pasted in said pasting frames are displayed in said template image sequentially in a real time fashion, and wherein said crop boundary displayed on said entered image has a similar shape to one of said pasting frames that is selected by selecting a corresponding frame of said template image on said second sub display area.

8. An imaging system as recited in claim 7, further comprising a frame modifying device for modifying the size or position of any of said pasting frames of said template.

9. An imaging system as recited in claim 8, wherein said resolution adjusting device adjusts the input resolution for each of said entered images to be synthesized, in accordance with the output resolution of said image output device, the size of said cropping area of each of said entered images, and the size of said pasting frame where said cropping area is to be pasted in.

10. An image system as recited in claim 8, wherein said frame modifying device may change the size and position of any of said pasting frames after an image is pasted in said pasting frame, and said resolution adjusting device readjusts the input resolution in accordance with the modified size of said pasting frame.

11. An imaging system as recited in claim 6, wherein said template is selected from among a plurality of templates showing different layouts, and one of said plurality of templates has an outer frame and at least an inner frame as said pasting frames, and a first image pasted in said inner frame is superimposed on a second image that is pasted in said outer frame, and wherein said resolution adjusting device adjusts the input resolution for the first image in accordance with the input resolution for the second image.

12. An imaging system as recited in claim 6, further comprising a storage device for storing said synthetic image as an image file consisting of image data of respective images as pasted in said pasting frames, and position data representative of relative positions of said pasting frames to each other.

13. An imaging system comprising a scanner, a monitor, an image processing device and a printer, said scanner having a pre-scanning mode for taking image data out of an original image at a low resolution, and a fine scanning mode for taking image data out of said original image at a higher resolution, wherein said image processing device produces an output image from said image data taken in said fine scanning mode, said imaging system further comprising:
 a cropping area designating device for designating a cropping area of said original image on said preview image, said cropping area being scanned in said fine scanning mode; and
 a resolution setting device for obtaining an optimum resolution for said fine scanning mode on the basis of a size of the designated cropping area, a print size of said cropping area and an output resolution of said printer, and setting said higher resolution of said scanner at a value that is determined by said optimum resolution,
 said monitor displaying a main display area, a first sub display area, and a second sub display area simultaneously, and said main display area displaying an image as entered through said scanner, and a crop boundary on said entered image to designate a cropping area of said entered image, wherein image data of said cropping area is used for producing said output image, said first sub display area displaying a template image of a template that shows a layout for said output image, and said second sub display area displaying a thumbnail image of said entered image.

14. An imaging system as recited in claim 13, wherein there are a plurality of predetermined input resolutions available for said scanner, and said resolution setting device sets said higher resolution of said scanner at one of said predetermined input resolutions that is the nearest to said optimum resolution, or less than and nearer to said optimum resolution, or more than and nearer to said optimum resolution.

15. An imaging system as recited in claim 14, wherein said monitor displays said crop boundary on said preview image to show said cropping area as designated by said cropping area designating device, a size of said original image, a size of a recording sheet used in said printer, and said template image of said template, said template showing at least a pasting frame and a size and a position of said pasting frame relative to the recording sheet, wherein said cropping area may be pasted in said pasting frame by operating on said monitor.

16. An imaging system as recited in claim 15, wherein said template has a plurality of pasting frames, and said image processing device produces a synthetic image from a plurality of images entered through said scanner, by designating said cropping area of each of said entered images and pasting said cropping area in a respective one of said pasting frames of said template.

17. An imaging system as recited in claim 16, wherein said crop boundary displayed on said preview image has a similar shape to one of said pasting frames that is selected by selecting a corresponding frame of said template image.

18. An imaging system as recited in claim 17, further comprising a frame modifying device for modifying the size or position of any of said pasting frames of said template by modifying the size or position of either said crop boundary or a corresponding frame of said template image.

19. An imaging system as recited in claim 18, wherein said resolution setting device sets said higher resolution of said scanner for each of said entered images, in accordance with the output resolution of said printer, the size of said cropping area of each of said entered images, and the size of said pasting frame where said cropping area is to be pasted in.

20. An image system as recited in claim 19, wherein said frame modifying device may change the size and position of any of said pasting frames after an image is pasted in said pasting frame, and said resolution setting device resets said higher resolution of said scanner in accordance with the modified size of said pasting frame.

21. An imaging system comprising:
 an image input device for entering an image from an external data storage device that stores full-dressed image data of at least an image, and thumbnail image data of said image;
 a display device for displaying a thumbnail of said entered image on the basis of said thumbnail image data;
 a cropping area designating device for designating a cropping area of said entered image on said displayed thumbnail;
 a printer for printing said cropping area in a designated size on the basis of said full-dressed image data; and
 a resolution converting device for converting resolution of said full-dressed image data into a value that is determined in accordance with an original size and the designated print size of said cropping area, and an output resolution of said printer,
 said display device displaying a main display area, a first sub display area, and a second sub display area simultaneously, and said main display area displaying said entered image as entered through said image input device, and a crop boundary on said entered image to designate said cropping area of said entered image, wherein image data of said cropping area is used for producing said output image, said first sub display area displaying a template image of a template that shows a layout for said output image, and said second sub display area displaying said thumbnail image of said entered image.

22. An imaging system comprising:
 a monitor,
 an image input device having a pre-scanning mode for generating first image data from an original image at a first resolution, and a fine scanning mode for generating second image data from said original image at a second resolution which is greater than said first resolution,
 an image processing device for processing said first image data to correct color and gradation of the first image data to produce a first output image for display on said monitor and transferring correction parameters used to correct said color and said gradation to said image input device and processing said second image data to produce a second output image, wherein said image input device processes utilizes said correction parameters to generate said second image data;
 an image output device for outputting said second output image as a hard copy or as data file, and
 a resolution adjusting device for automatically adjusting said second resolution for said fine scanning mode in accordance with an output resolution of said image output device, a size of said second output image, and a size of said original image, and said monitor displaying a main display area, a first sub display area, and a second sub display area simultaneously, and said main display area displaying an image as entered through said image input device, and a crop boundary on said entered image to designate a cropping area of said entered image, wherein image data of said cropping area is used for producing an output image, said first sub display area displaying a template image of a template that shows a layout for said output image, and said second sub display area displaying a thumbnail image of said entered image.

23. An imaging system comprising:

an image input device for entering image data from an image file, an image processing device for processing said image data to produce an output image, an image output device for outputting said output image as a hard copy or as data file, a resolution adjusting device for automatically adjusting an input resolution of said image input device in accordance with an output resolution of said image output device, a size or data pixel number of said output image, and a data pixel number of said image file, and a monitor for displaying a main display area, a first sub display area, and a second sub display area simultaneously, and said main display area displaying an image as entered through said image input device, and a crop boundary on said entered image to designate a cropping area of said entered image, wherein image data of said cropping area is used for producing said output image, said first sub display area displaying a template image of a template that shows a layout for said output image, and said second sub display area displaying a thumbnail image of said entered image.

* * * * *